US010083408B2

(12) United States Patent
Magori

(10) Patent No.: US 10,083,408 B2
(45) Date of Patent: Sep. 25, 2018

(54) ENERGY CONSERVATION UNIT AND SYSTEM OF A BUILDING BY WAY OF INTERACTIVE LEARNING

(76) Inventor: Bumpei Magori, Kanagawa (JP)

(*) Notice: Subject to any disclaimer, the term of this patent is extended or adjusted under 35 U.S.C. 154(b) by 1043 days.

(21) Appl. No.: 13/640,489

(22) PCT Filed: Sep. 24, 2010

(86) PCT No.: PCT/JP2010/066486
§ 371 (c)(1),
(2), (4) Date: Oct. 11, 2012

(87) PCT Pub. No.: WO2011/129025
PCT Pub. Date: Oct. 20, 2011

(65) Prior Publication Data
US 2013/0030592 A1    Jan. 31, 2013

(30) Foreign Application Priority Data

Apr. 13, 2010 (JP) ................. 2010-092475

(51) Int. Cl.
G06Q 10/06 (2012.01)
G06Q 50/08 (2012.01)
G06Q 50/16 (2012.01)

(52) U.S. Cl.
CPC ......... *G06Q 10/06* (2013.01); *G06Q 10/0637* (2013.01); *G06Q 50/08* (2013.01); *G06Q 50/163* (2013.01)

(58) Field of Classification Search
CPC .. G06Q 10/06; G06Q 10/0637; G06Q 50/163; G06Q 50/08

(Continued)

(56) References Cited

U.S. PATENT DOCUMENTS

2003/0233432 A1    12/2003 Davis et al.
2005/0143863 A1    6/2005 Ruane et al.
(Continued)

FOREIGN PATENT DOCUMENTS

DE    102007017901 A1    10/2008
JP    10-49552 A    2/1998
(Continued)

OTHER PUBLICATIONS

Kolokotsa et al., Building and Environment Journal paper (44, 2009, pp. 1850-1863), "Predictive control techniques for energy and indoor environmental quality management in buildings".*
(Continued)

Primary Examiner — Thomas C Lee
Assistant Examiner — Tri T Nguyen
(74) Attorney, Agent, or Firm — Osha Liang LLP

(57) ABSTRACT

A unit includes a receiving member of sensor information of the unit, a communication member with the other units, a storage member for storing target building information and information on sensors and facilities in an information-exchangeable manner, an identification member for identifying an internal unit and an external unit of the other building by specific information, an optimization member for reading an energy calculation expression, etc., of the internal unit, selecting an operation condition provided, and performing simulation of the entire target building, a related-unit searching member for searching the other internal unit and the external unit for a related unit, an optimization member for reading an operation condition from the related units, performing simulation for optimization, and an operation member for operating the facilities on the basis of the operation condition and the sensor information.

18 Claims, 16 Drawing Sheets

(58) Field of Classification Search
USPC .......................................................... 700/295
See application file for complete search history.

(56) References Cited

U.S. PATENT DOCUMENTS

| | | | |
|---|---|---|---|
| 2007/0055757 A1* | 3/2007 | Mairs .................... | H04L 12/281 709/223 |
| 2007/0055760 A1 | 3/2007 | McCoy et al. | |
| 2008/0177423 A1* | 7/2008 | Brickfield et al. ............ | 700/291 |
| 2009/0048718 A1 | 2/2009 | Richard et al. | |
| 2009/0088991 A1* | 4/2009 | Brzezowski et al. .......... | 702/62 |
| 2010/0174419 A1* | 7/2010 | Brumfield .............. | G01R 22/10 700/295 |
| 2010/0217450 A1* | 8/2010 | Beal .......................... | H02J 3/14 700/291 |

FOREIGN PATENT DOCUMENTS

| | | |
|---|---|---|
| JP | 2002-163002 A | 6/2002 |
| JP | 2002-202998 A | 7/2002 |
| JP | 2005-261050 A | 9/2005 |
| JP | 2007-162982 A | 6/2007 |
| JP | 2008-25908 A | 2/2008 |
| JP | 2008-40865 A | 2/2008 |
| JP | 2010-10939 A | 1/2010 |
| WO | 0048376 A1 | 8/2000 |

OTHER PUBLICATIONS

Doukas et al., 2007 Building and Environment Journal paper (vol. 42, Issue 10, pp. 3562-3569), "Intelligent building energy management system using rule sets".*
Huang et al., 1997 Journal paper "Using genetic algorithms to optimize controller parameters for HVAC systems", Energy and Buildings, 26 (1997), pp. 277-282.*
International Search Report w/translation issued in PCT/JP2010/066486 dated Nov. 2, 2010 (4 pages).
Written Opinion issued in PCT/JP2010/066486 dated Nov. 2, 2010 (3 pages).
Extended European Search Report in corresponding European Application No. 10849862.7, dated Apr. 7, 2014 (9 pages).
Office Action issued in corresponding European application No. 10849862.7, dated Oct. 19, 2016 (6 pages).

* cited by examiner

ENERGY CONSERVATION UNIT AND SYSTEM OF A BUILDING BY WAY OF INTERACTIVE LEARNING

TECHNICAL FIELD

The present invention relates to a unit and system capable of saving energy or minimizing emissions of carbon dioxide at the time of operating a building (hereinafter both are referred to as energy saving together unless explicitly being described separately). Specifically, the present invention relates to an energy saving unit and to a system using the unit capable of saving energy by referring to operation conditions of buildings other than a building to be a target of energy saving.

BACKGROUND ART

In order to save energy at a building, such as a house, a factory, an office building, a commercial building, a hotel, a hospital, etc., at operation time, it is necessary to manage operation states of various facilities of the building in some way, such as opening or closing states of windows and doors of a target building, use states of rooms, number of persons in a room, working states of an air conditioning system, air conditioners, ventilators, boilers, etc.

In order to provide such a system, etc., for example, Patent Literature 1 has disclosed a system in which energy consumption of a facility machine that is artificially operated is measured, and if a discrepancy between the energy consumption and a target value artificially determined in advance becomes large, a warning, etc., is output. Also, Patent Literature 2 has disclosed a method of directly controlling facilities on the basis of measured energy consumption values of facilities and management target values determined by a system. And at that time, the method uses, for example, a comfort index (Predicted Mean Vote (PMV)), etc., on air conditioning as management target values. Also, Patent Literature 3 has disclosed a building-operation optimization support system. In the building operation optimization support system, simulation is used for optimization of operation conditions, and operation data in the case of actually operating a building on a first operation condition is multiplied by a ratio of a simulation result based on the first operation condition to a simulation result based on a second operation condition so that operation data is calculated on the assumption that the building is operated on the second operation condition in order to improve precision of the simulation. Thereby, necessity of operation, management or adjustment by a skilled person has been drastically reduced.

However, in all these systems, an individual target building is only operated independently, and there has been a problem in that degree of energy saving depends on knowledge and skill of an individual person who is in charge of operation management of the building. Also, since there is no building having the same environmental condition and building structure, it is not possible to objectively grasp to what extent energy saving is possible for a building ideally while energy saving is carried out for the building individually. Further, it is possible that there is a building in which smarter operation is performed among many buildings and facilities than the target building. However, it is not possible to find such facilities and buildings in consideration of a difference in environmental condition, and also not possible to make reference in order to save energy for the target building. Accordingly, there has been a problem with that degree of energy saving of each building is substantially divided and insufficient.

CITATION LIST

Patent Literature

[PTL 1] Japanese Unexamined Patent Application Publication No. 2005-261050
[PTL 2] Japanese Unexamined Patent Application Publication No. 2007-162982
[PTL 3] Japanese Unexamined Patent Application Publication No. 2008-40865

SUMMARY OF INVENTION

Problems to be Solved by the Invention

An object of the present invention is to propose a unit capable of saving energy of a target building, to that degree equally to another building having achieved utmost energy saving, without depending on knowledge and skill of a responsible person who performs operation of the building, and a system using the unit.

Means for Solving the Problems

According to a first embodiment of the present invention, there is provided a unit for saving energy for a building, including: an input means for receiving information from sensors assigned to the unit; a communication means capable of mutually communicating with other units; a unit-specific information storage means for storing information in an exchangeable format between different units on a location, a structure, an environmental condition of a target building in which the unit is installed, and information for identifying the sensors assigned to the unit and facilities assigned to the unit; an identification means for identifying an internal unit being another unit installed in the target building and an external unit being another unit installed in a building other than the target building by the unit-specific information; an internal optimization means for reading an energy calculation expression of an internal unit identified by the identification means, selecting any one of operation conditions provided in the unit in advance, composing an energy calculation expression of an entire target building and performing simulation, and optimizing an energy balance of the target building; a related unit search means for searching for other units having an architectural condition related to the unit, and including a unit determined by the identification means as an external unit in addition to the other internal units; an internal and external optimization processing means for reading an operation condition corresponding to the unit from the other internal units and external units searched by the related unit search means, performing simulation using the read operation condition and the entire energy calculation expression, and optimizing an energy balance of the target building; and an operation means for operating the facilities assigned to the unit on the basis of the optimized operation conditions and the information from the assigned sensors.

Here, it is desirable that the identification means and the internal optimization means are executed after the unit is newly installed in the target building, or restarted. Also, it is desirable that the unit further includes a relationship table for identifying in advance whether or not operation of the assigned facilities influences the other facilities in energy, wherein a range of the optimization processing by the internal optimization means is changed by information in the relationship table. Also, it is desirable that the related unit search means searches for the other units assumed to perform control of assigned facilities in a similar pattern to the unit in energy balance. Also, it is desirable that the optimization processing for saving energy is performed at least in two stages including an initial stage when the unit is newly installed in the target building or restarted, and a stage when the other unit is newly installed or restarted in a steady operation thereafter. Also, it is desirable that both optimization processing in a range of a plurality of operation conditions stored in the unit in advance and optimization processing in a range of a plurality of operation conditions read by searching the related units are performed in the initial stage, and thereby at least three-stage optimization processing is performed. Also, it is desirable that at least one of the optimization processing is executed by a genetic algorithm.

According to a second embodiment of the present invention, there is provided an energy saving system for a building, wherein units according to any one of the above are connected in a communicable manner with each other through a communication network. Here, it is desirable that the unit has a parallel relationship with any one of the other units, and is allowed to be flexibly installed and abolished. Also, it is desirable that a new candidate for an operation condition is introduced in the system when a new unit is added, or an existing unit is restarted.

According to a third embodiment of the present invention, there is provided a server for saving energy for a building, including: a communication means for allowing the server to communicate with a plurality of clients; a client-specific information storage means for storing information in an exchangeable format between different clients on a location, a structure, an environmental condition of a target building in which the client is installed, and information for identifying the sensors assigned to the client and facilities assigned to the client; an identification means for identifying an internal client being another client installed in the target building and an external client being another client installed in a building other than the target building by the client-specific information; an internal optimization means for reading an energy calculation expression of an internal client identified by the identification means, selecting any one of operation conditions provided in the server in advance, composing an energy calculation expression of an entire target building and performing simulation, and optimizing an energy balance of the target building; a related client search means for searching for other clients having an architectural condition related to the client, and including a client determined by the identification means as an external client in addition to the other internal clients; and an internal and external optimization processing means for reading an operation condition corresponding to the client from the other internal clients and external clients searched by the related client search means, performing simulation using the read operation condition and the entire energy calculation expression, and optimizing an energy balance of the target building.

According to a fourth embodiment of the present invention, there is provided an energy saving system including: a server according to the above; and a plurality of clients connected to the server in a communicable manner, wherein the clients include an input means for receiving information from sensors assigned to the clients, an operation means for operating the facilities assigned to the clients, and a communication means for allowing mutual communication with the server.

Effect of the Invention

It becomes possible to save energy and to minimize emissions of carbon dioxide on an objectively optimum condition without depending on knowledge and skill of a responsible person who performs operation of the individual building. In saving energy of a target building, it is possible to refer to energy saving conditions of a building that has achieved utmost energy saving among many buildings including buildings other than the target building, and thus it is possible to automatically achieve utmost energy saving and minimization of carbon dioxide emissions substantially equally to that with the passage of time.

DESCRIPTION OF EMBODIMENTS

Figure 1:
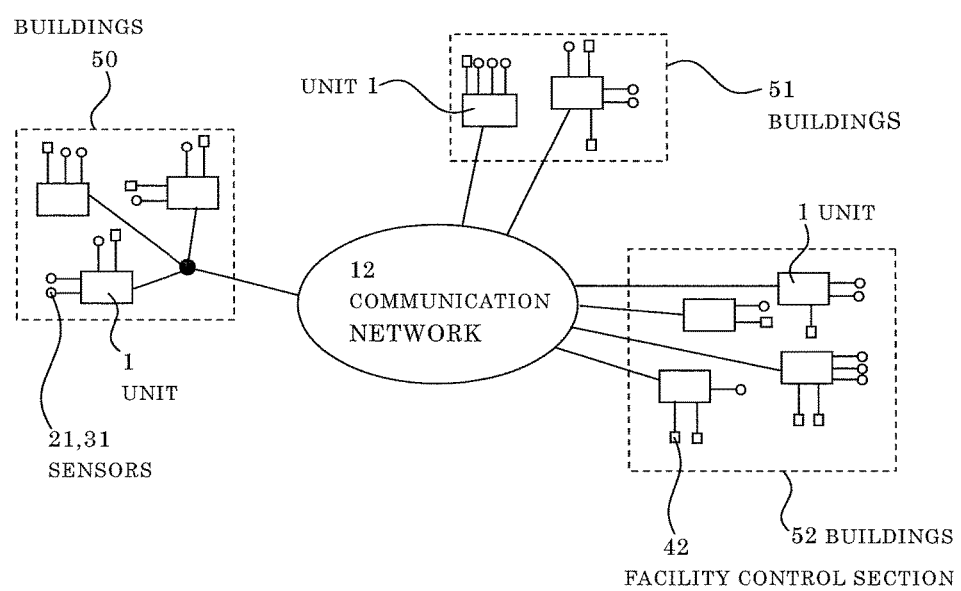
FIG. 1 is a conceptual diagram of a system in which a plurality of units are connected through a communication network in a mutually communicable manner.

A description will be given of an embodiment of the present invention with reference to the drawings. A building mentioned here means one building or a collection of two buildings or more, inside of which or in the surroundings thereof people or machines work for various activities during daytime or at night by consuming energy, and the building is considered integrally for which energy management is performed. The use of the building may be any one of the following: an office, a house, a factory, a commercial building, a hotel, a hospital, etc., or may be a collection of buildings for a plurality of uses. Further, as long as energy management is performed integrally, the building may be a certain area including a plurality of buildings that are built adjacent to each other or in the vicinity, road facilities, illumination facilities, traffic control facilities, parking facilities, electric power facilities that perform power transmission and power generation, hot-water supply facilities, etc.

In this regard, for convenience of description, when a specific unit (hereinafter sometimes this is referred to as a target unit) is taken notice of, a specific building in which the unit is installed is called a target building in distinction from the other buildings in which the other units are installed. Also, a plurality of units that are installed in the target building is called internal units including the target unit of interest, and units that are installed in the buildings other than the target building are called external units.

Also, facilities means building apparatuses and facility machines including those installed in the target building. The building apparatuses means apparatuses that are installed as a part of the building, and apparatuses that become doorways for which material exchange or energy exchange is controlled between the inside and the outside of the building, for example, windows with opening/closing mechanisms, ventilating openings (hereinafter they are referred to typically as windows), doors with opening/closing mechanisms, shutters, etc., in the same manner, removable roofs, window roofs, louvers, etc., (hereinafter they are simply referred to typically as doors). Further, the building apparatuses include elements through which heat exchange is disregarded in many cases in daily operation, such as fixed roofs, walls, and usual glass windows that are exposed to the outside air. It is difficult to control such an element on a daily basis, but the elements are considered as elements that need improvement for saving energy. Also, facility machines means machinery that consumes or generates energy with its operation, and that can be controlled through an operation panel or a facility control section, etc. The machinery that directly consumes energy or indirectly affecting energy consumption of a building includes, for example, facility equipment such as an air conditioner, a ventilating machine, a lighting instrument, a heat source equipment, a boiler, a cooling tower, a heat pump air conditioner, etc., gas equipment for water feeding or drainage or sanitary, such as a feed water and drainage pump; hot water supply equipment, a fuel battery, etc., electric facility equipment, such as a receiving and transforming electricity facility, a generator, a rechargeable battery, a capacitor, etc., machines that use electrical energy, such as a refrigerator, a heating cabinet, a copy machine, a computer, a printer, etc., equipment that uses fossil fuel, such as a gas stove, a kerosene heater, etc. Further, machinery that can generate energy by itself, such as a solar power generation apparatus, a wind power apparatus are also included.

FIG. 1 is a conceptual diagram illustrating a schematic configuration of an embodiment of an energy saving system using units. A plurality of units 1 are installed in buildings 50 to 52, which are surrounded by broken lines, respectively, in the figure. Each unit has sensors 21 and 31, and facility control sections 42 capable of controlling the assigned facilities in an part assigned to each unit itself in the target building. And individual units are mutually connected through a communication network 12, and are allowed to communicate with each other autonomously. A method of connecting each unit 1 with the communication network 12 may be an independent connection of each unit 1 with the communication network 12, or may be a connection through a LAN, which is constructed in a building by wirelessly or in a wired manner, to the communication network 12, etc. The communication network may be any network allowing the units to mutually communicate, and exemplified by the Internet, a mobile telephone network, a PHS network, a closed wireless or wired network such as an intranet.

One unit is installed for each range in a relatively close vicinity that needs little work for connection or has few problems for connection, for example, each room of the target building, each floor, for each electric outlet, and thus a plurality of units are installed in the entire building. In this manner, although many of sensors and facilities are scattered around remote locations with each other because of the structure of a target building, in case that alterations are made after that, such as extension or reconstruction of the building, increase or decrease of facilities, etc., new units installation or abolishment only for the changed part is sufficient. That is to say, each unit has an equal and parallel relationship with each other without having priorities, and thus it is possible to build a system capable of changing flexibly in accordance with installation and abolishment of the structure and the facilities of the building. In this regard, each unit and the assigned facilities and the assigned sensors may be connected in a wired manner or wirelessly.

Figure 2:
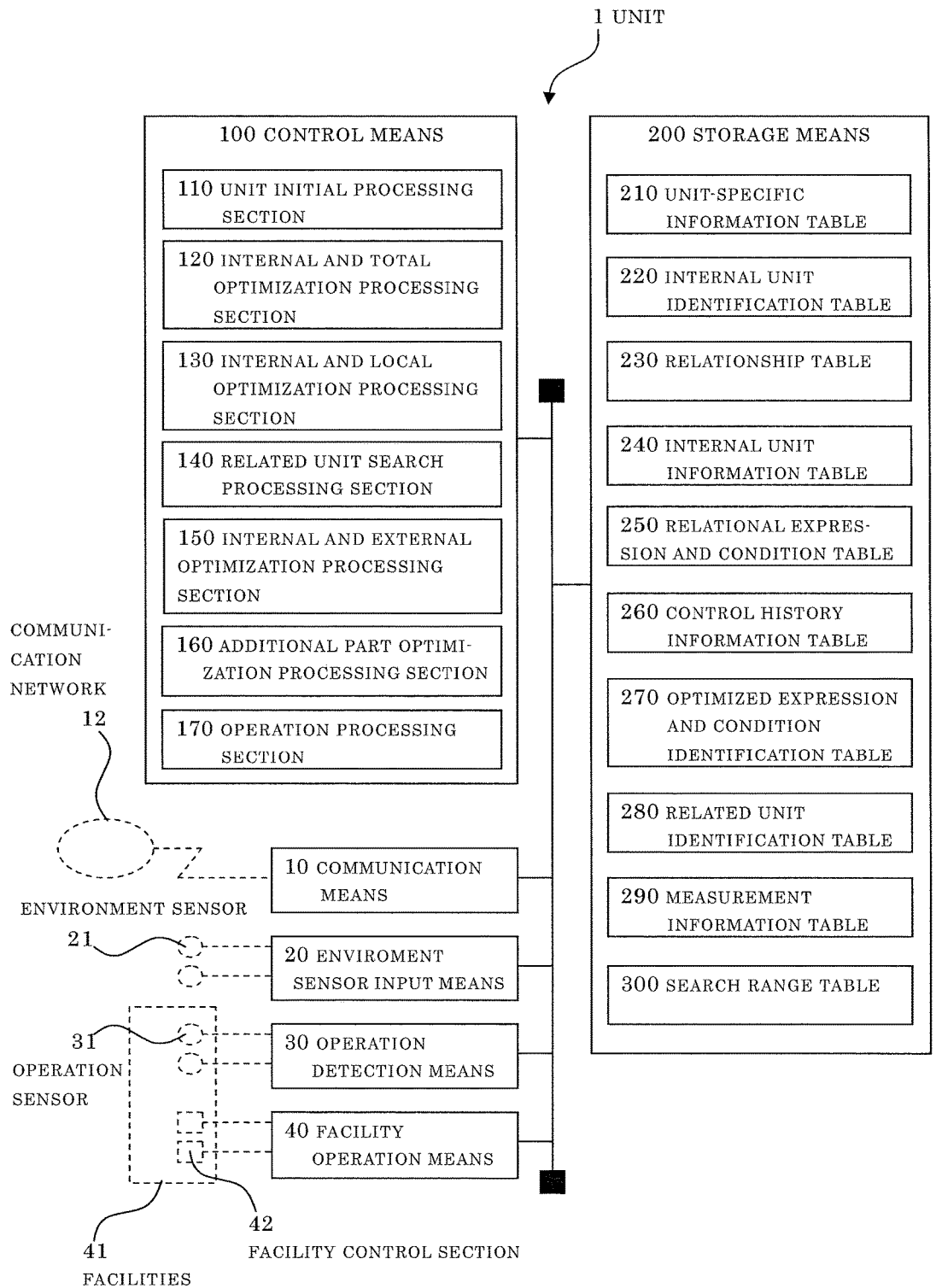
FIG. 2 is a block diagram illustrating a schematic configuration of a unit.

FIG. 2 is a block diagram illustrating a schematic configuration of one unit. A unit is a computer including a storage means 200 for information, such as a hard disk and a flash memory, a computer program that is read from the storage means 200, and a control section 100 including a CPU that runs thereby. Further, the unit includes various interfaces, for example, a communication means 10 that is connected to a communication network 12 for allowing communication among the units, and for obtaining external data, such as an amount of rainfall, a wind speed, a wind direction, etc., from the Meteorological Agency and the like through a communication network as needed, an environment sensor input means 20 connected to the unit for receiving information from the environment sensor 21 that measures an environment, such as temperature, humidity, wind direction, air pressure, sunshine, number of persons in a room, etc., in and around the building, an operation detection means 30 that detects through the operation sensor 31 that a facility 41 assigned to the unit is operated from the outside of the system by a person, etc. and a facility operation means 40 capable of controlling the facilities 41 assigned to the unit through the facility control section 42, etc. In this regard, for the sake of simplicity, in the following, first, a description will be given of the case where there is only one of the facilities assigned to a target unit. After that, in FIG. 13, a description will be given of the case where there are a plurality of facilities assigned to the target unit.

First, a description will be given of the storage means 200. In this regard, all pieces of information stored in the storage means of each unit is generated and stored in accordance with a common protocol to the other units, and thus it is possible to compare and exchange the information among the units. This is the same for information on building structures and environments, measurement information of the sensors, energy-balance calculation expressions of the facilities, and operation conditions.

A unit-specific information table 210 stores information that is specific to an individual unit, for example, identification information for identifying the unit to distinguish the unit from the other units, building identification information, such as a name, an address, latitude and longitude, a postal code, etc., that can identify the target building, information on target building use and information identifying position of the unit in the building, identification information of the assigned sensors and installation position information, identification information of the assigned facilities, information for a type, and installation position information of the assigned facilities, a total floor area in the range assigned to the unit, an air conditioning area, etc. Further, the unit-specific information table 210 stores structure information of the entire target building or in the range assigned to the unit, specifically, basic structure information such as the building is made of wood or steel reinforced concrete, etc., and identification information such as a number of floors in the assigned range, position of windows and doors, directions of windows and walls, insulation efficiency of walls, the opposite side of a wall is which one of outdoor air, a corridor or a room, etc. Also, the unit-specific information table 210 stores environment information specific to the target building, for example, sunshine information which describes which outer wall of the target building gets sunlight and how many hours in one day on a fair weather, etc., and also stores calculation item information necessary for calculating energy balance of the range assigned to the unit, etc. These pieces of information are input and stored in advance when the unit is installed for the first time. By storing such information, it is possible to identify which facilities of which building are control targets of the unit, and to distinguish the internal units and the external units described later.

An internal unit identification table 220 stores information for identifying which unit is an internal unit that is installed in the target building among a plurality of units constituting the system. This table is generated by the initial processing after the unit is installed in the processing performed by the unit initial processing section 110. Also, when a new unit is added to the system, and if the unit is an internal unit, the unit is additionally recorded in the table. The reason why this table is provided is that the other units are also installed in buildings other than the target building, and thus it is necessary to distinguish the other units and the internal units that are installed in the target building and in the range for energy saving. By storing in this table, it is possible to easily distinguish internal units and external units without making a search, and thus it becomes possible to easily obtain energy balance of the target building.

A relationship table 230 is a table that identifies which of the other facilities are primarily influenced in operation by each of the assigned facilities in energy, and identifies how the operation conditions of the influenced facilities are changed. The relationship table 230 is determined for each of the assigned facilities in advance, and information is inputted and stored after the facilities assigned to the unit is fixed. The reason why this table is provided is that control of various facilities primarily influences the control of the other facilities through temperature, sunshine, etc., and thus that influence is to be identified in advance. A relationship table of an existing unit is modified in the case where at least one of the internal units is changed somehow, for example, in the case where a new internal unit is added, in the case where new software is added to at least one of the internal units, in the case where a setting value of any one of the facility devices is changed, and in the case where the assigned facilities device is changed or removed, etc. When a new unit is added to the system, relationship tables of the existing units are added on the basis of the relationship table stored in the new unit.

Incidentally, the case where the facilities primarily influence the other facilities in energy aspect, for example, the case where operation states of window opening/closing apparatuses and ventilation fans change a room temperature and humidity so that the operation load of the air conditioner is influenced, and the case where operation states of manufacturing machines and office machines generate heat with their operation so that the operation load of the air conditioner is influenced, etc. Also, the case is included where an operation state of an apparatus adjusting angles of window shades changes an amount of sunlight entering into a room so that the illumination load and the air conditioning load are influenced. Also, the case is included where an operation state of an air conditioner for a certain room influences the operation state of the air conditioner of the other rooms and the corridors that are communicating with that room. Also, the case is included where an operation state of an air conditioner influences operation loads of a water cooler or a refrigerator, etc., that are installed in a room under the influence of that air conditioner. Also, the case is included where existence of a wall having low insulation efficiency, existence of a sunny wall facing to the south, and existence of a wall with little sun on the contrary, etc., influence the air conditioning load of an inside space partitioned by that wall. This is the same for glass windows and fixed roofs. On the other hand, a normal illumination load in an office, etc., is relatively small although a certain amount of heat is generated by lighting, and thus it is possible to disregard influence on the other facilities. Accordingly, it is not necessary to store the illumination load into the relationship table.

Storing such a relationship table makes it apparent whether there are influences between the facilities in energy, and it becomes possible to identify how to change the operation of the facilities that are influenced. Thereby, it becomes easier to perform optimization processing in order to save energy.

An internal unit information table 240 is a table that stores information on energy-balance calculation expressions and operation information that are actually used in operation, and that have been read from each internal unit in accordance with calculation item information stored in the unit-specific information table 210. By providing this table, it becomes possible to perform energy simulation of the entire target building in the unit as necessary. This table is updated each time when information on energy-balance calculation expressions and operation information that are used in each unit are changed in accordance with the changes.

A relational expression and condition table 250 is a table in which a plurality of pairs of combinations of an energy-balance calculation expression and an operation condition that are assumed to be suitable for the assigned facilities are provided in advance and stored before a new unit is installed. The energy-balance calculation expression is an expression for obtaining an energy balance of the assigned range by adding calculation items that generate and consume energy in the assigned range of the unit. The operation condition defines how much weight is added to which element and which range for controlling depending on a season, a time zone, and use characteristic of the building.

In the case of performing control in consideration of natural environment, it becomes problems to identify what is a factor that dominates the overall assigned range regardless a period of time or what is a dominant factor in a limited time period, because there may be various patterns in variations of energy balance. For example, year-round energy consumption may be reduced by controlling a certain day with a different pattern from that of the other days out of 365 days in a year. On the contrary, there may be a case where it is better to correctly control a decisive factor for a daily situation. The same thing may occur in one day, and also may occur for each season. For example, there may be operation conditions, etc., that it is desirable to mainly control the amount of solar radiation in air conditioning in winter, whereas, it is desirable to mainly control movement of persons in air conditioning in summer. It is possible to improve control efficiency by including these factors.

Further, this is the same for the assigned facilities. For example, some of the facilities save energy by short-time operation, and the other of the facilities save energy by long-time operation. Some of cooling machines that make cold water change efficiency depending on difference in outdoor air temperature and humidity. Also, there are cases where energy saving is promoted at day and night in total by accumulating heat at night and reducing generation of heat in daytime, and there are cases where energy saving is promoted for one week as a unit by accumulating heat on Saturday and Sunday and reducing generation of heat on weekdays. Accordingly, a plurality of kinds of operation condition, etc., that are considered to be suitable for the individual facilities are provided in advance. In this manner, the operation conditions, etc., that are considered to be suitable for the assigned range are studied in advance, and some candidates are stored in the relational expression and condition table 250.

In this manner, it is possible to search the combinations for an optimization condition at first, and thus it becomes easy to reach an optimum condition. Also, there is a possibility that energy-balance calculation expressions and operation conditions that are different from those used in each unit are introduced into the system each time a new unit is installed in the system. Accordingly, there arises a possibility that energy saving level is improved more for the other units.

A control history information table 260 is a table in which history of control performed on the assigned facilities of the unit is stored. By providing such a table, it becomes possible to return from the operation conditions, etc., that have been employed for actual operation to the previous operation conditions, etc., with a situation change after that. Also, in the case where an operation condition that was determined to have advantages for improving energy saving by a prior simulation is turned out to be ineffective in the actual operation after that, it becomes possible to return to the previous condition by performing evaluation by autocorrelation. Also, for example, an operation condition that was optimum at a certain season one year ago has become not optimum and has not been employed by a change of the seasons, but it becomes possible to be employed again when the same season comes around.

An optimized expression and condition identification table 270 is a table that stores the calculation items necessary for calculating an energy balance of the target building, and the energy-balance calculation expression and the operation condition that are determined to be optimum by the optimization processing concerning the assigned facilities of the other internal units and the target unit. This table stores calculation items, energy-balance calculation expressions, and operation conditions when the unit initial processing section 110 processes them, and this table is updated each time when they are changed by the optimization processing.

A related unit identification table 280 is a table in which the related unit search section 140 searched each unit regardless of an internal unit or an external unit by referring to a search range table 310 described later, and then stores identification information, etc., of the extracted related unit. Here, the related unit means a unit that might use a new operation condition, etc., having a possibility of improving an energy saving level of the target unit and the target building. The related unit search section 140 selects in advance search items on the basis of the characteristics, etc., of the assigned facilities from the viewpoint of searching such a unit, and makes a search. For example, the related unit is a unit of a building having the same kind of use as that of the target building, and a unit of a building including the same kind of facilities as the assigned facilities, etc. The related unit identification table 280 stores identification information of the related unit and information on which search item is hit. This table is generated by the search processing of the initial processing, and after that, the table is updated in the case where a new unit is added or contents of the existing units are changed, and then restart processing is performed in the steady processing.

A measurement information table 290 is a table in which measurement information sent from the assigned sensors as necessary is stored. A simulation in the optimization processing is performed using information stored in this table.

A search range table 300 is a table in which a search item to make a search for a related unit, and a range that related units seems to be searched in, that is to say, a search item and a range which are able to search units from the system that seem to control facilities in a similar pattern to the target unit in energy are specified and stored in advance.

For the search items, it is possible to use a search item with which a related unit is easy to be identified, for example, a use of a building, types of facilities, total floor areas of the building and the assigned range, an air conditioning area, a basic structure of a building, and sunshine information of the assigned range, etc. And the assigned range of the target unit and the characteristic of the assigned facilities are stored in advance as a premise.

For a specific example of a range that related units seem to be searched in, for example, in the case where a search item is a use of a building, if the use of the target building is a normal office, it is usual for a normal office to have a pattern in which energy consumption is large in daytime on weekdays and is small at night and on weekends and holidays. Accordingly, for the use of a building of the related unit, a hospital, a school, a factory without midnight operation, etc., that are assumed to have a similar energy consumption pattern in addition to the same normal offices are to be searched. Also, if the use of the target building is a family-type condominium, a range of the related unit to be searched includes not only a family-type condominium, but also a detached house having a similar energy consumption pattern.

In the same manner, on a search item of the type of the facilities, a search can be made for a unit assigned to the facilities that behave similarly in energy balance with the assigned facilities. For example, in the case where the facilities of the target building is a combination of a turbo refrigerating machine and three cold-and-hot water pumps, units assigned to the facilities having a combination of similar turbo refrigerating machine and one or two cold water pumps are to be searched. This is because the three cold-and-hot water pumps are used at the time of maximum capacity operation, but if a temperature load is small, one or two pumps are sometimes operated, and operation condition having best energy efficiency is different for each case of different number of pumps operated, and thus the operation conditions of the individual cases can be referenced with each other.

Also, on search items of a total floor area and an air conditioning area, ranges that are considered to have a similar pattern in energy should be identified. Here, it is determined that units assigned to the areas in the range increased or decreased by ±50% are to be searched, respectively. For the other search items, the ranges are determined to make a search for the units having a similar pattern in the same manner in energy are to be searched. However, a numeric-value range that increases or decreases should be suitably changed and used as necessary.

A related unit that was searched in such a range has very similar conditions to the conditions to be controlled by a target unit in energy balance. Furthermore, if skill and knowledge of an engineer who is managing the related unit are excellent, there is a possibility that operation conditions that are more excellent than the current operation conditions in energy saving are applied. Thus, by searching such a related unit, it becomes possible to introduce more excellent operation conditions.

In this regard, the storage means 200 stores information necessary for operation of the unit, but is not illustrated in FIG. 2, for example, a basic program that controls the entire flow including the initial processing flow and the steady processing flow.

Figure 3:
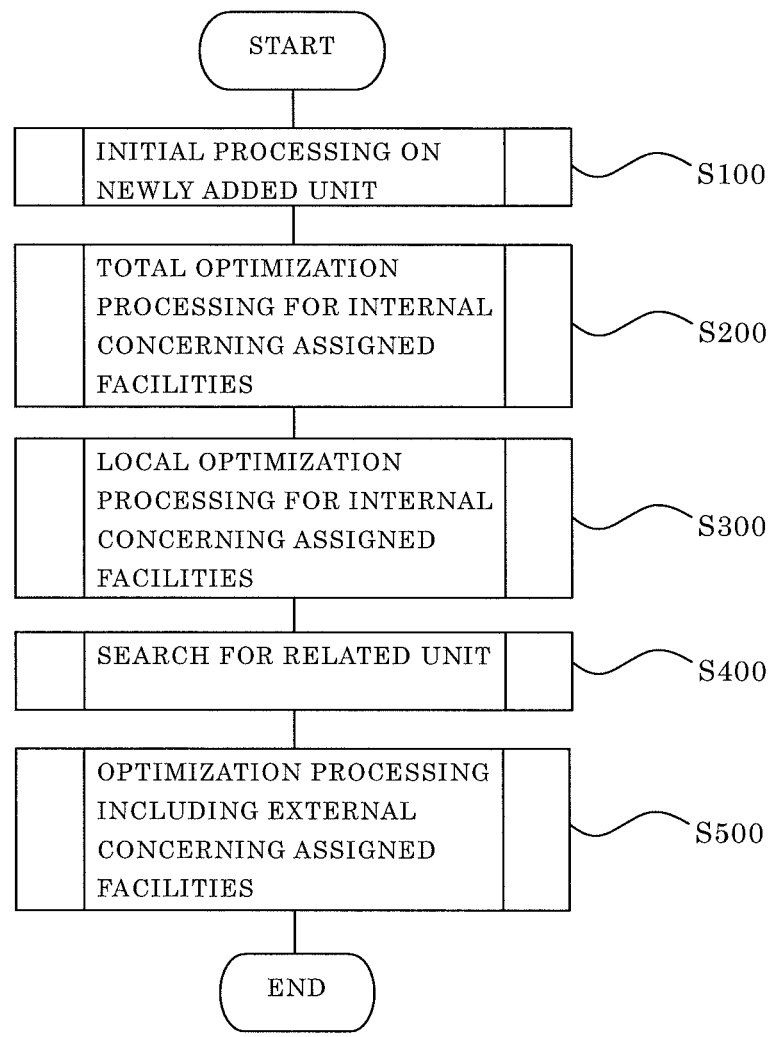
FIG. 3 is a flowchart schematically illustrating an initial processing flow of the unit.

Next, a description will be given of the functions of the unit control section 100 illustrated in FIG. 2 by giving an example of a processing flow having the unit as a target unit in the case where one new unit is added to the system illustrated in FIG. 1, or one existing unit is subjected to a change of settings and is restarted in the system illustrated in FIG. 1. FIG. 3 is a flowchart illustrating an initial processing flow of the target unit in such a case. In the following, a description will be given of the initial processing flow using FIG. 3 to FIG. 13.

Figure 4:
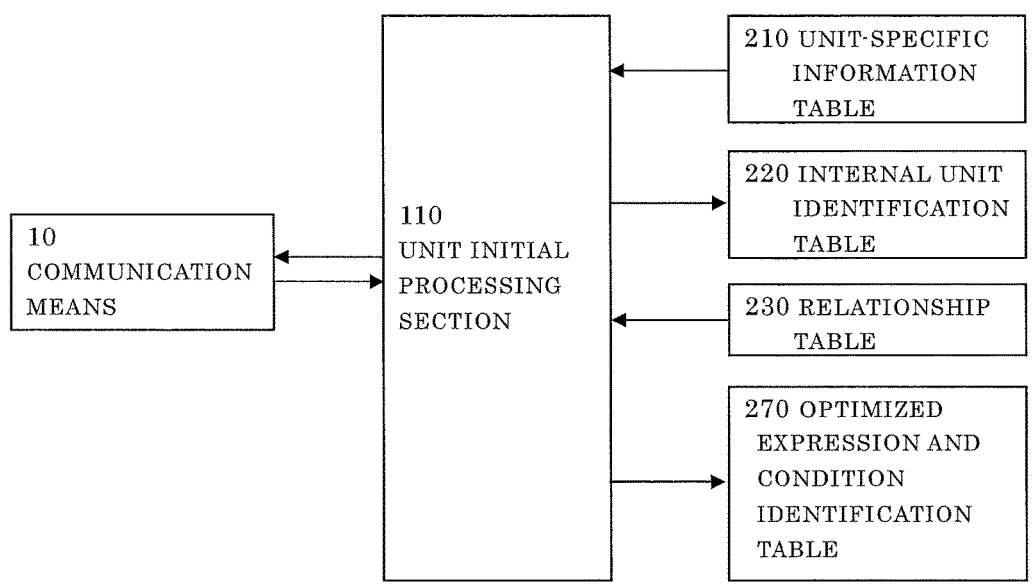
FIG. 4 is a block diagram illustrating a relationship between a unit initial processing section and other means.
Figure 5:
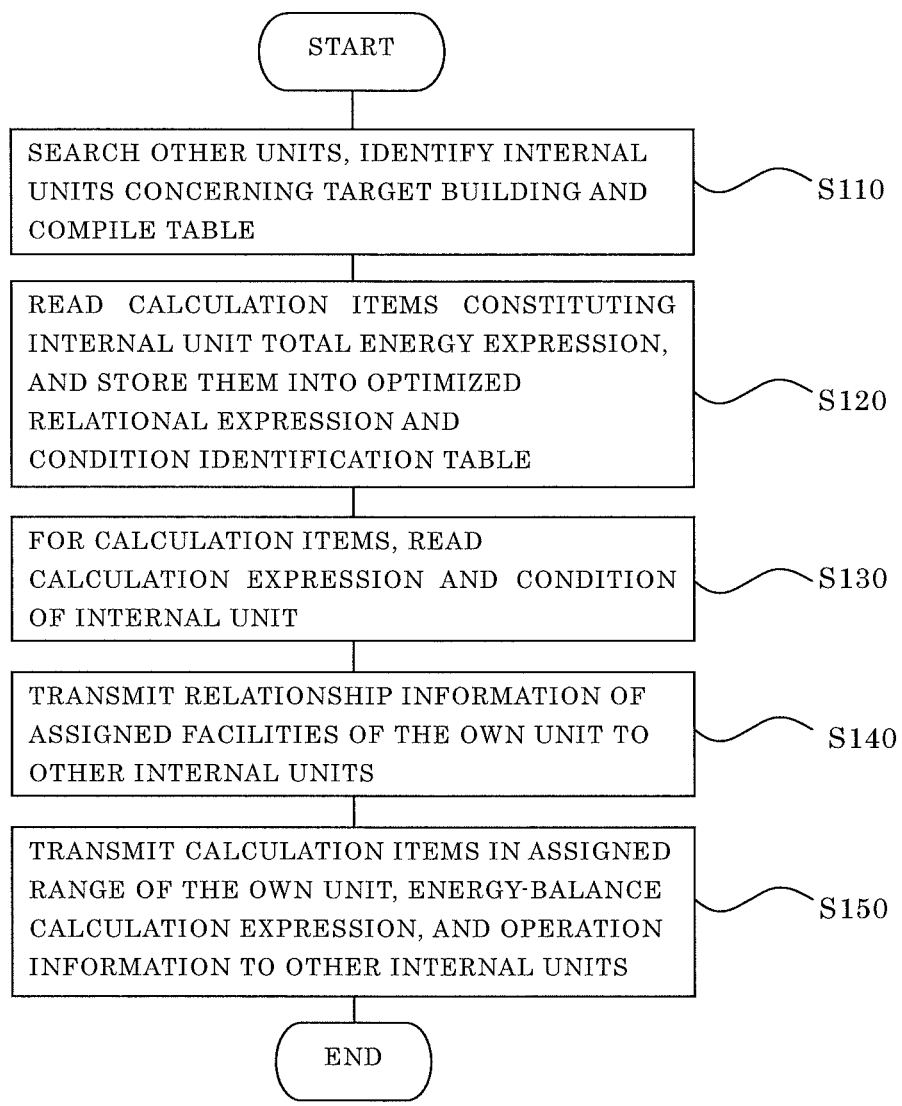
FIG. 5 is a flowchart illustrating detailed processing in S100 step.

When one new unit is installed in the target building, the initial flow in FIG. 3 is started, and first, the initial processing step on the target unit is executed (S100 step). A relationship between the unit initial processing section 110 executing this step and the other means in the unit is illustrated in FIG. 4. An arrow in FIG. 4 illustrates a main direction flow of information, and this is the same hereinafter. FIG. 5 is a flowchart illustrating the contents of S100 step further in detail. In the flow in FIG. 5, first, all the other units in the system are searched, a building name and an address that allows identification of a building in which the target unit is installed are read from the unit-specific information table 210 of each unit, and these are compared with the name and the address of the building in which the target unit is installed to identify a unit installed in the same building as that of the target unit. The identified units are regarded as internal units, and the identification information thereof is stored in the internal unit identification table 220 (S110 step). Thereby, it becomes possible to identify an internal unit without searching the other units, and thus it becomes possible to easily identify a range of performing simulation of energy balance on the target unit. That is to say, the unit initial processing section 110 and the unit-specific information table 210 function as identification means for distinguishing each unit from the other units. In this regard, as an alternative of those, the internal unit identification table 220 can be used for identification means.

Next, the calculation item information for calculating the energy balance in the range assigned to the internal unit is read from the unit-specific information table of each internal unit. Further, the calculation item information in the range assigned to the target unit is read from the unit-specific information table 210, and is stored in the newest-expression and condition identification table 270 (S120 step). Next, energy-balance calculation expressions and operation conditions in the assigned range are read from the individual internal units on the basis of the calculation item information read from the other internal units, and are stored in the newest-expression and condition identification table 270 (S130 step). In this regard, processing in S120 step and S130 step is preparation for performing energy-balance simulation of the entire target building in the target unit.

Next, the calculation items for calculating the energy balance in the range assigned to the target unit and the energy-balance calculation expressions, and the operation conditions are transmitted to the other internal units. The other internal units that have received these store the information in the own newest-expression and condition identification table (S140 step). This is to make it possible for the other internal units to perform optimization including a newly added unit.

Next, information of the relationship table 230 stored in the target unit in advance is read and is transmitted to the other internal units (S150 step). Each of the internal units reflects changed information out of the information of the relationship table transmitted from the target unit on the own relationship table. This is processing for the other internal units to more suitably perform optimization processing in the case where the target unit is in charge of new facilities and sensors whose information is not possessed by the other existing internal units, and in the case where the target unit takes in an element that assumed to be small and is disregarded by the other existing internal units, in order to improve control precision, and further in the case where the target unit has removed a part of the facilities of the existing internal unit, and is restarted.

Figure 6:
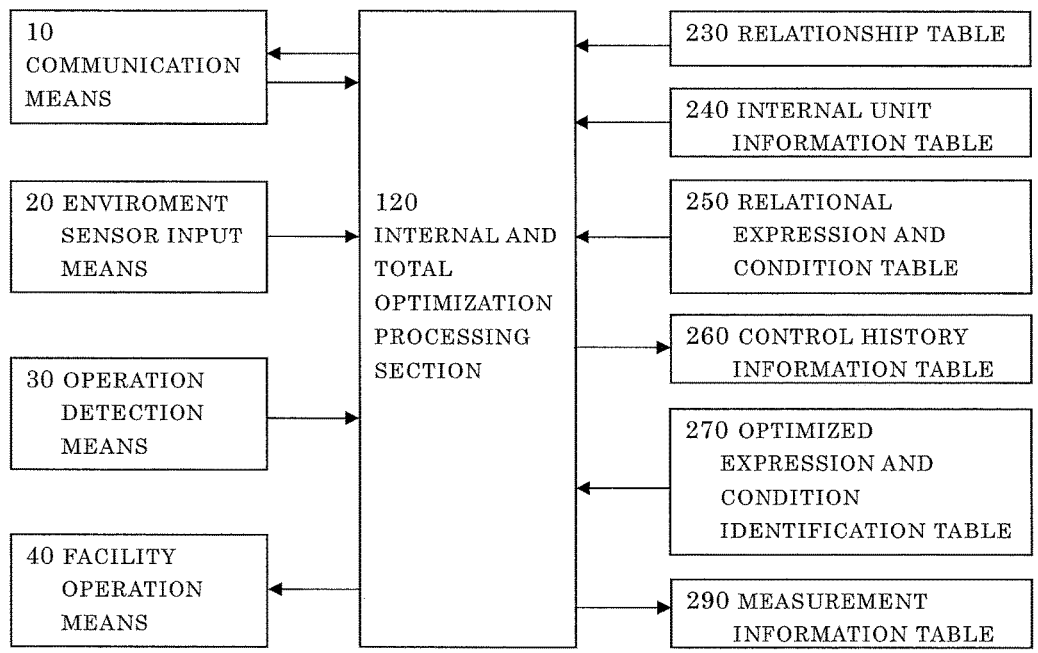
FIG. 6 is a block diagram illustrating a relationship between an internal and total optimization processing section and the other means.

Thus, the flow in FIG. 5, that is to say, S100 step in FIG. 3 is completed, and next, the processing proceeds to S200 step. In S200 step, optimization processing is performed on operation of the facilities assigned to the target unit in the range of the energy-balance calculation expression and operation condition stored in the target unit in advance. Also, optimization processing on the entire target building is performed in the case where the assigned facilities influence the other facilities in energy. A relationship between the internal and total optimization processing section 120 that executes this step and the other processing section is illustrated in FIG. 6.

Figure 7:
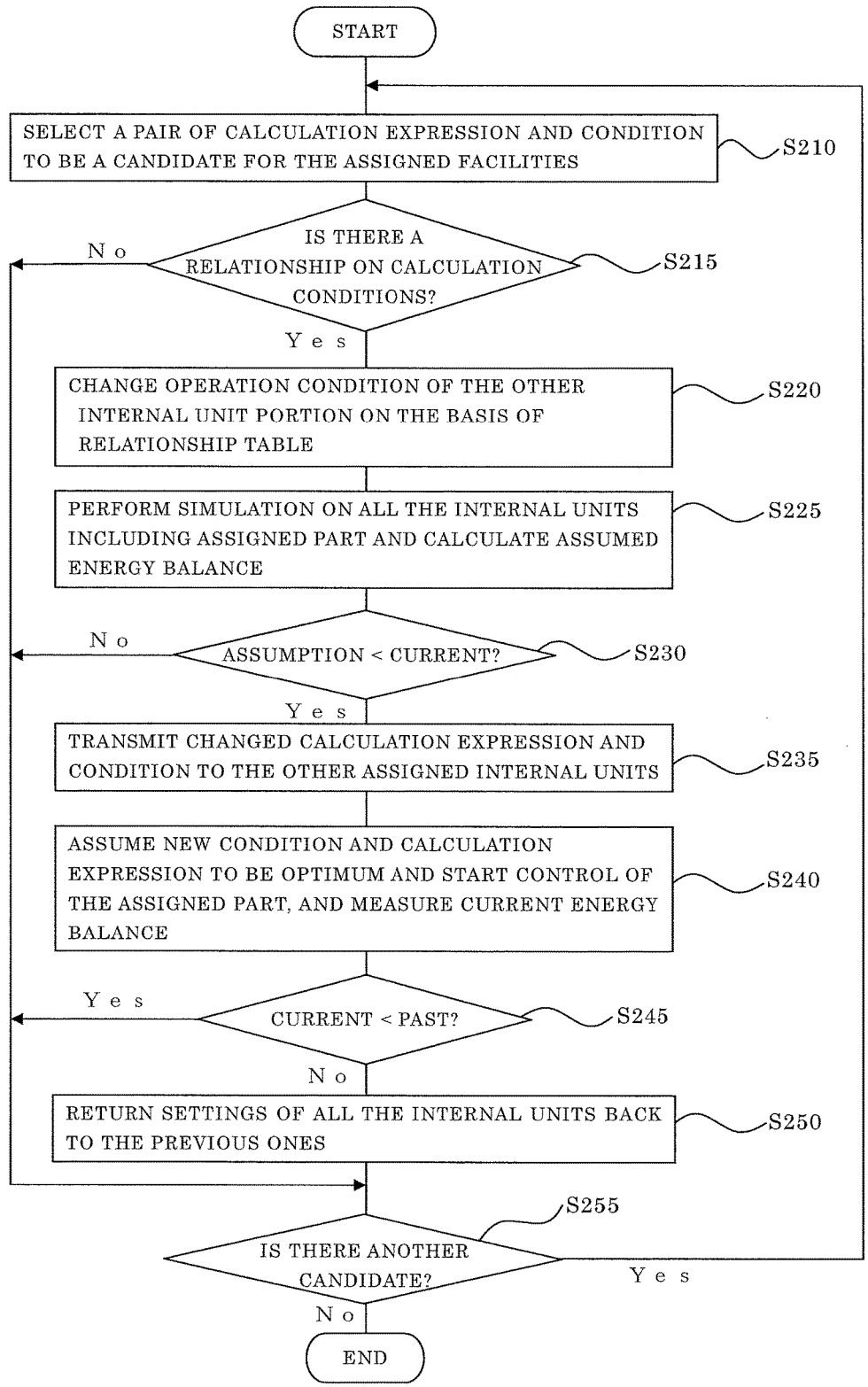
FIG. 7 is a flowchart illustrating detailed processing of S200 step.

Also, the flow of S200 step is further illustrated in detail by a flowchart in FIG. 7. When S200 step is started, first, a selection is made of a pair of energy-balance calculation expression and operation condition that become a candidate of the facility assigned to the target unit from the relational expression and condition table 250 (S210 step). The selection may be made in the order of some priorities, but in this example, is made in the order of storage in the table from the beginning.

Next, the relationship table 230 is referenced, and a determination is made of whether the facilities assigned to the target unit influence the other facilities of the target building in energy, that is to say, whether there is a relationship or not (S215 step). If there is no relationship, the flow branches leftward and goes to S255 step, whereas if there is a relationship, the flow branches downward and goes to S220 step. The reason why the determination is made by existence of a relationship in this manner is that if there is a relationship, it is not possible to cut out only the part assigned to the target unit for the optimization, and it is necessary to perform simulation, etc., of the optimization of the energy balance on the entire target building. On the contrary, if there is no relationship, optimization should be performed only on the part assigned by the target unit. In this regard, the optimization in the case of no relationship is performed in the succeeding S300 step.

In S220 step in the case where there is a relationship, the operation conditions of the part assigned to the internal unit that was taken in the internal unit information table 240 is read, and a change is made on the basis of the relationship table. Here, an example of having a relationship is the case where only an air conditioner has been used to operate continuously in summer in order to adjust room temperature to an adequate temperature determined in advance, but a fan is newly installed as facilities to take in outside air. The operation condition of the fan is set such that the fan is operated when the room temperature is higher than the adequate temperature and outside temperature is lower than the room temperature by 3° C. In this case, energy is necessary for operating the fan, but if the outside temperature is lower than the room temperature by a certain degrees, driving the fan causes the room temperature to decrease, and thus operation of the fan influences air conditioning load of the air conditioner. And under a certain condition such as at low outside temperature, etc., the driving energy of the air conditioner becomes larger than the driving energy of the fan, and thus it is desirable to change the operation condition of the air conditioner from continuous operation so far to stop in a time period in which the fan is operated. In this manner, the operation conditions are suitably changed on the basis of the relationships, and thus further energy saving is possible.

Also, as the other case where there is a relationship, an example is given of the case where when an existing unit has been controlling lighting facilities so as to adjust number of lighting lamps depending on number of persons in a room, new facilities is installed in order to adjust angles of window shades that are attached to windows. In this case, the angles of window shades are adjusted so that a lot of sunlight enters into the room in the daytime in fine weather in winter, and thus it is possible to go to a state that causes no trouble even if lamps by the windows are put off. When the angles of window shades are adjusted in such a way, it is desirable to change the operation condition of the lighting facilities such that the lamps by the window are put off from the viewpoint of energy saving. In this regard, in this example, an air conditioning load is influenced by taking sunlight in a room, and thus the operation condition of the air conditioner is also changed. On the contrary, in summer, it is necessary to close the window shades to block the sunlight, and to light the lamp. However, the air conditioning load is reduced, and thus the operation conditions of the lighting facilities and the air conditioning facilities are changed so that more energy saving is achieved.

In this manner, the operation conditions of the individual influenced facilities are suitably changed on the basis of the relationship table, and thus energy saving is promoted as the entire target building.

Next, energy simulation for one day is performed on the entire target building including the assigned part of the target unit using data read from the internal unit information table 240 and suitably changed, the energy-balance calculation expression and the operation condition of the target unit, selected in S210 step, and data in the measurement information table 290, and then assumed energy consumption is calculated (S225 step). In this regard, in the case of proceeding to S225 step for the first time after installation of a unit, there is no data measured by the assigned sensors in the measurement information table 290, and thus the flow skips S225 step, and immediately proceeds to S230 step.

Next, a determination is made of whether daily assumed energy consumption of the entire target building is lower than current daily energy consumption (S230 step). If the assumed energy consumption is equal to the current energy consumption or greater, the flow branches leftward and goes to S255 step. If the assumed energy consumption is less than the current energy consumption, the flow branches downward and goes to S235 step. In this case, a combination of the energy-balance calculation expression and the operation condition selected in S210 step as a candidate has a possibility of having further energy saving advantages than the current combination, and thus it is necessary to further perform demonstrated operation. In this regard, in the case of processing S230 step for the first time after installation of a unit, there is no current daily energy consumption data and assumed daily energy consumption data, and thus the flow skips S230 step and goes to S235 step.

In S235 step, the energy-balance calculation expression and the operation condition changed in S220 step are transmitted to the other internal units (S235 step). This is because the operation condition of each unit is changed to the corresponding operation condition, etc., to the candidate so that test operation can be performed on all of the internal units. And test operation is performed for one day in S240 step, measurement information from the sensors is stored in the measurement information table, and the actual energy balance is calculated. Next, in S245 step, a comparison is made between the actual energy balance obtained in S240 step and the energy balance used so far based on the previous condition, and a determination is made of whether the energy balance calculated in S240 step is further energy saving than the previous energy balance (S245 step). In this regard, in the case of processing S245 step for the first time after installation of a unit, there is no data measured by the assigned sensors in the measurement information table 290, the flow branches leftward unconditionally and goes to S255 step, the energy-balance calculation expression and the operation condition that were selected as a candidate are regarded as the previous ones, and then the following processing is performed.

In S245 step, if the energy balance calculated in S240 step is more energy saving than the previous energy balance, it is verified that the combination of candidates selected in S210 step is advantageous by actual measurement in view of energy saving. Accordingly, test operation is continued as actual operation without change, the result is stored in the optimized expression and condition identification table 270 and the control history information table 260, and the flow branches leftward to proceed to S255 step.

On the other hand, in S245 step, if the energy balance calculated in S240 step is equally or less energy saving than the previous energy balance, it becomes clear that the candidate selected in S210 is not particularly advantageous by actual measurement. Accordingly, canceling operation of the conditions used for the test operation of the candidate, etc., is performed, the setting of the target unit is returned to that of before S210 step, and an instruction is transmitted to all the internal units in order to cancel the contents transmitted in S235 step that instruct the change, and to return to the previous state (S250 step), and the processing proceeds to S255 step.

In S255 step, the relational expression and condition table 250 is searched, and a determination is made of whether all of the combination of the energy-balance calculation expressions and the operation conditions that are able to be candidates for the assigned facilities of the target unit have been examined or not (S210 step). If there is still a candidate that has not been examined, the flow branches rightward and goes to S210 step, and the processing continues until a new candidate selection and examination of all the candidates are completed. If all the combinations have been examined, the flow branches downward and the processing is completed. Thus, all of the flow in FIG. 7, that is to say, S200 step in FIG. 3 is completed.

In this manner, in S200 step, on the operation of the facilities assigned to the target unit, if the assigned facilities influence the other facilities in energy, optimization processing for energy saving is performed on the entire target building. This is because each of the facilities sometimes influences the other facilities in energy, and sometimes does not influence. Thus, there is a mixture of the case where the range of performing optimization processing must be the entire target building and the case where the range can be limited to only the assigned range of the target unit. Depending on either of the cases, amounts of processing and processing time required for the optimization processing differ greatly. And thus, this is intended to allow optimization for energy saving with less processing.

Figure 8:
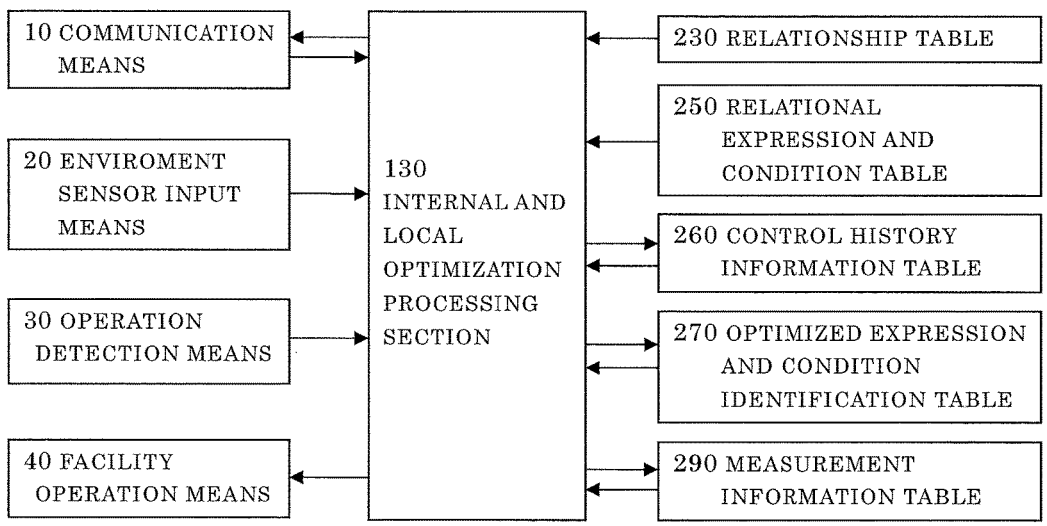
FIG. 8 is a block diagram illustrating a relationship between an internal and local optimization processing section and the other means.

Next, the processing proceeds to S300 step in FIG. 3. In this step, unlike the S200 step, the case where no relationship is regarded to exist between the assigned facilities and the facilities assigned to the other internal units is processed. For that purpose, optimization processing for only the facilities assigned to the target unit should be performed. S300 step is illustrated in detail by a flowchart in FIG. 9. In this regard, relationships between the internal and local optimization processing section 130 that executes S300 step and the other means are illustrated in FIG. 8.

Figure 9:
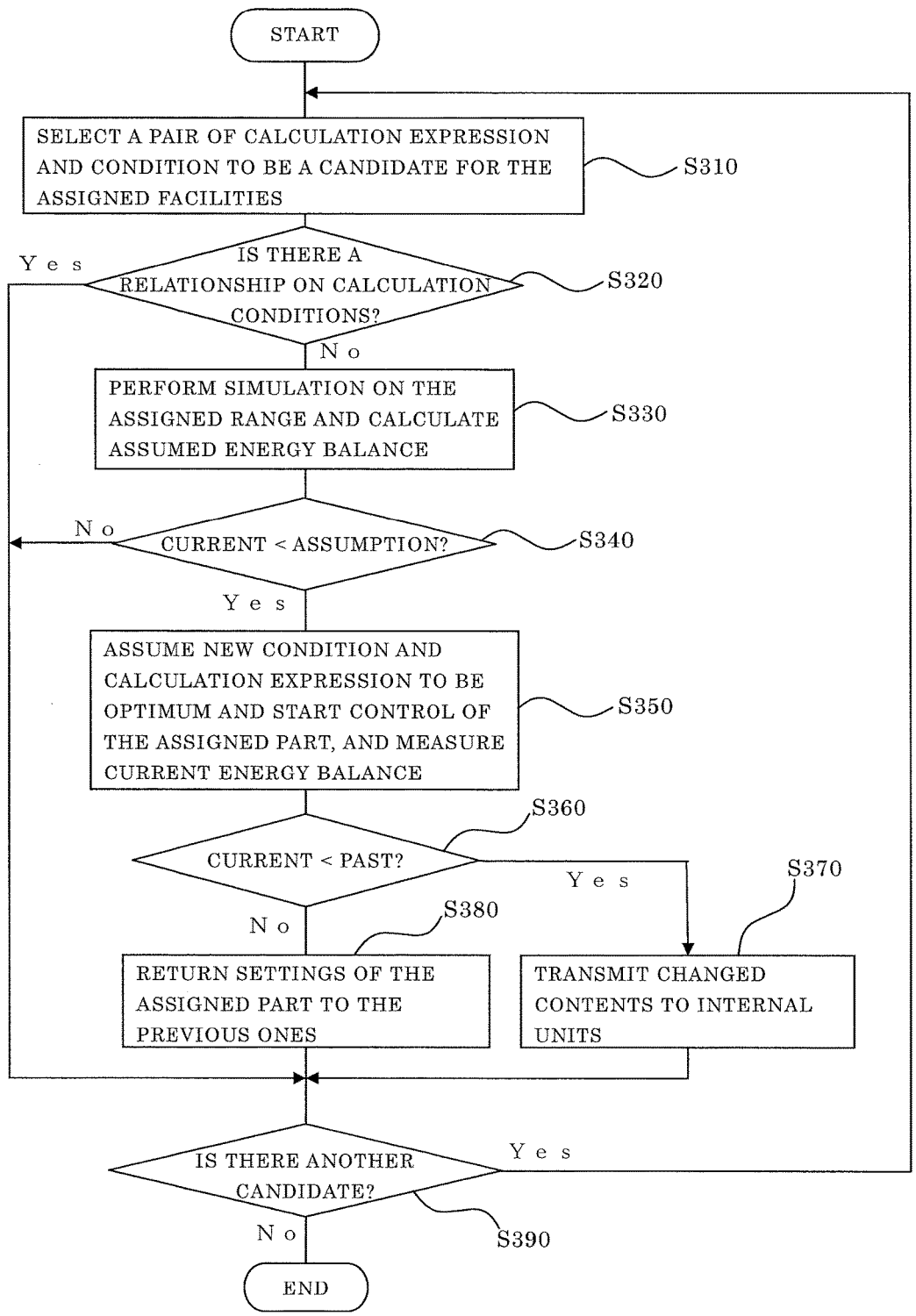
FIG. 9 is a flowchart illustrating detailed processing of S300 step.

When a flow in FIG. 9 is started, a selection is made of a pair of an energy-calculation expression and an operation condition as a candidate from the relational expression and condition table 250 with respect to the facilities assigned to the target unit (S310 step). This selection may be made by selecting a pair from those determined to have no relationship in S215 step in FIG. 7, but in this example, same selection processing as that in S215 step is simply performed again. Next, with reference to the relationship table 230, a determination is made of whether the facilities assigned to the target unit have an influence in energy on the other facilities of the target building, that is to say, whether there is a relationship or not (S320 step). If there is a relationship in energy with the other facilities, the flow branches leftward, and goes to S390 step, and a determination is made of whether there is a next candidate. On the other hand, if there is no relationship in energy, the flow branches downward, goes to S330 step, and daily energy simulation is performed in the assigned range by the target unit using the selected energy-balance calculation expression and operation condition, and the data in the measurement information table 290 in order to calculate assumed energy consumption (S330 step). In this regard, in the case of proceeding to S330 step for the first time after installation of a unit, there is no necessary data in the same manner as the processing in S225 step in FIG. 7, thus the flow skips S330 step, and proceeds to S340 step.

Next, a determination is made of whether the assumed daily energy consumption in the target range of the target unit is less than the current daily energy consumption or not (S340 step). If the assumed energy consumption is equal to or more than the current energy consumption, the flow branches leftward, and goes to S390 step. If the assumed energy consumption is less than the current energy consumption, the flow branches downward, goes to S350 step, and performs actual test operation. In this regard, in the case of proceeding to S340 step for the first time after installation of a unit, the flow skips S340 step, and proceeds to test operation in S350 step.

In S350 step, test operation is performed for one day, measurement information from the sensors is stored in the measurement information table, and actual energy balance is calculated. Next, in S360 step, a comparison is made between the actual energy balance obtained in S350 step and the energy balance used so far under the previous condition, and a determination is made of whether the energy balance calculated in S350 step is further more energy saving than the previous energy balance. If the assumed energy consumption is equal to or more than the current energy consumption, it is apparent that energy saving is not possible, thus the flow branches downward, and proceeds to S380 step. In S380 step, the control that was performed using a candidate combination for test operation is returned to a previous state of the test operation, and proceeds to S390 step.

On the other hand, in S360 step, if the energy balance calculated in S350 step is more energy saving than the previous energy balance, it is verified that the combination of candidates selected in S310 step is advantageous by the actual measurement in energy saving, and thus the test operation is continued to actual operation without change. The result is stored into the newest-expression and condition identification table 270 and the control history table 260, and the flow branches rightward from S360 step to proceed to S370 step. In this regard, in the case of proceeding to S360 step for the first time after installation of a unit, there is no data measured by the assigned sensors in the measurement information table 290, and thus the flow unconditionally branches rightward and proceeds to S370 step, the energy-balance calculation expression and the operation condition selected as a candidate are regarded as previous ones, and the following processing is performed.

In S370 step, the energy-balance calculation expression and the operation condition selected in S310 step are transmitted to the other internal units for the simulation in the other internal units, and the flow proceeds to S390 step. In S390 step, among the combinations of the energy-balance calculation expressions and the operation conditions of the assigned part, which are stored in the relational expression and condition table 250 in advance, a determination is made of whether there remains a pair of candidates not selected in S310 step or not. If a pair remains, the processing returns to S310 step, a new combination of candidates is selected, and the processing is continued, whereas if a pair does not remain, the processing is completed.

In this manner, it becomes possible to select an optimum energy-balance calculation expression and operation condition with respect to the assigned range having no relationship with the other facilities, and optimization processing is performed on the assigned facilities in the assigned range of the target unit, and thus it becomes unnecessary to perform calculation on the assigned range of the other internal units. Thus, all the flows in FIG. 9, that is to say, S300 step in FIG. 3 is completed.

As described above, by executing S200 step and S300 step in sequence, it becomes possible to perform optimization in the initial processing of various facilities that sometimes influence with each other or unilaterally in energy balance in less processing time.

In this manner, it is possible for a newly installed unit and a unit that has been restarted by installation of new facilities, etc., to import energy saving knowledge newly obtained and improved techniques based on the knowledge, and thus it becomes possible to save energy more suitably. Further, by going through the related unit search and subsequent internal and external optimization processing, described later, improved operation condition based on new knowledge of a new unit, etc., proliferates in the existing units in the system with passage of time. As a result, the energy saving levels of not only the target building, but also all the buildings in which the unit is installed gradually rise regardless of knowledge of responsible persons of each building, etc. That is to say, the energy saving levels of the entire buildings included in the system improve with the passage of time, and the levels rise to equal.

Referring back to FIG. 3, next, the processing proceeds to S400 step. In S400 step, related units are searched. The related units mentioned here means a unit that might use a new operation condition, etc., allowing improvement of the energy saving level of the target unit (and the target building) more than the current state. And in this related unit search, not only internal units installed in the target building, but also external units installed in buildings other that the target building are to be searched. In this manner, energy saving is not limited to the energy saving technique that is used for the target building and the knowledge of the responsible person, and it becomes possible to extensively search for good operation condition, etc., for energy saving.

Figure 11:
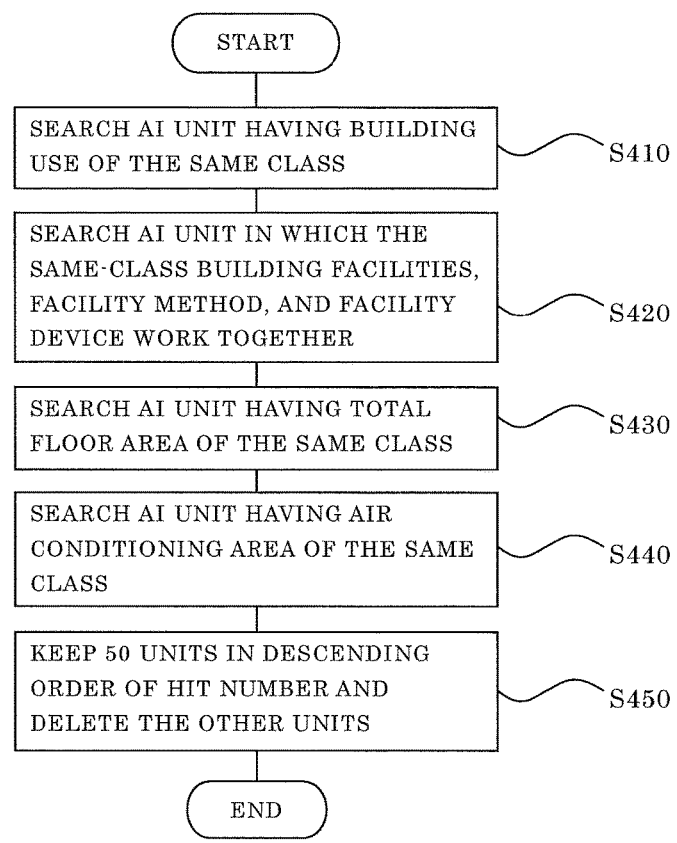
FIG. 11 is a flowchart illustrating detailed processing of S400 step.

An example of a detailed flowchart of the related unit search in S400 step is illustrated in FIG. 11. It is possible to make a search in various ways for a related unit that might use more excellent operation condition, etc., than the target unit, and the search is not particularly limited. Here, an example is illustrated of making a search using each search item, such as building use, a kind of assigned facilities, a total floor area of the assigned range, and an air conditioning area of the assigned range. In addition, it is possible to select and use search items in advance by the characteristics of the target building and the assigned facilities. The search items include, for example, an area (latitude, longitude, and altitude), a total floor area of the building, average temperature around the building, an average number of persons in and out of the building per total floor area on a daily basis or a number of users or a capacity of persons, a positional relationship of the building such as a number of floors and a direction of the assigned range, etc., a sunshine rate on the outer wall in the assigned range, etc. Further, examples of the search are specifically given, for example, making a search by a proper name of a turbo refrigerating machine for an apparatus having the same apparatus name, making a search for equipment whose COP (Coefficient Of Performance of equipment) value is included in a certain range, making a search for equipment whose capacity value at operation time, such as a refrigerating capacity, etc., is included in a certain range, making a search for a unit having a high degree of approximation of external environment of the unit, and making a search for a unit having a high degree of approximation in operation pattern.

Figure 10:
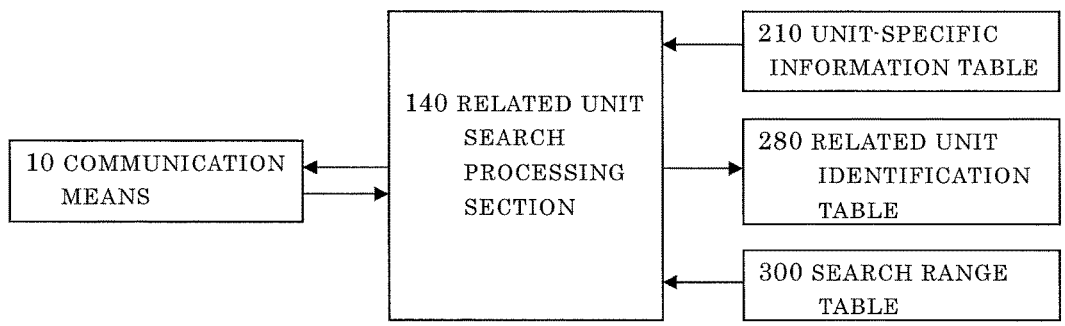
FIG. 10 is a block diagram illustrating a relationship between a related unit search processing section and the other means.

For these search items, what kind of unit is hit by the related-unit search processing is determined by the search range table 300 in advance. A relationship between the related unit search processing section 140 that performs the related unit search and the other means is illustrated in FIG. 10.

When the related unit search is started in the flow in FIG. 11, units are searched which are installed in the building whose use is in a range similar to the use of the target building of the target unit by referring to the search range table, and the identification information and the result that they are related with respect to use are stored in the related unit identification table 280 (S410 step). Further, the unit group searched in S410 step are narrowed down to units having the assigned facilities in a class similar to the facilities assigned to the target unit by referencing the search range table, and the result is stored in the related unit identification table 280 (S420 step). Further, the unit group searched in S420 step are narrowed down to units having a total floor area in a range of a class similar to the total floor area of the assigned range of the target unit by referencing the search range table, and a result is stored in the related unit identification table 280 (S430 step).

Next, the unit group searched in S430 step, further, are narrowed down to units having an air conditioning area of the assigned range in a range of a class similar to the air conditioning area of the assigned range of the target unit by referencing the search range table, and a result is stored in the related unit identification table 280 (S440 step). Finally, priorities from first to a predetermined number are given to the units having a number of times of hit in descending order in each step, and the units are kept as related units in the related unit identification table 280 (S450 step). This is because the units with a small number of times of hit are highly possibly not suitable for the operation condition, etc., of the target unit, and because test operation being desirably continued at least for one day, if the number of examination candidates is too large, optimization requires some days, and thus the number of examination candidates is narrowed down in order to reduce optimization processing load. In this example, the number of examination candidates is limited to 30. In this manner, the units are narrowed down in each step, and thus it becomes possible to select units having operation conditions that are more suitable for the facilities assigned to the target unit. Thus, the search processing of the flow in FIG. 11, that is to say, S400 step in FIG. 3, is completed, and next, the flow proceeds to S500 step in FIG. 3.

Figure 12:
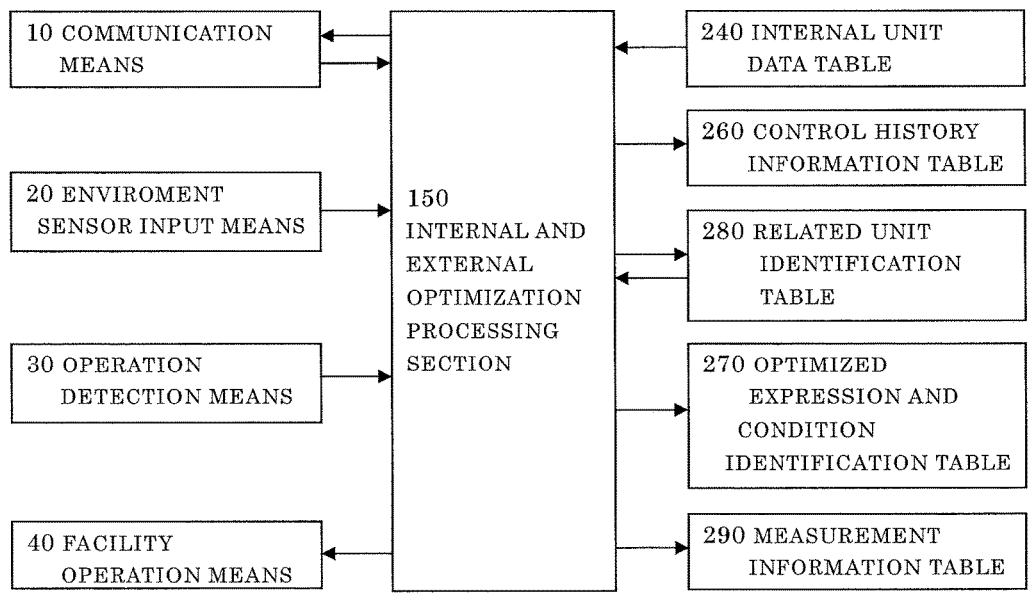
FIG. 12 is a block diagram illustrating a relationship between an internal and external optimization section and the other means.
Figure 13:
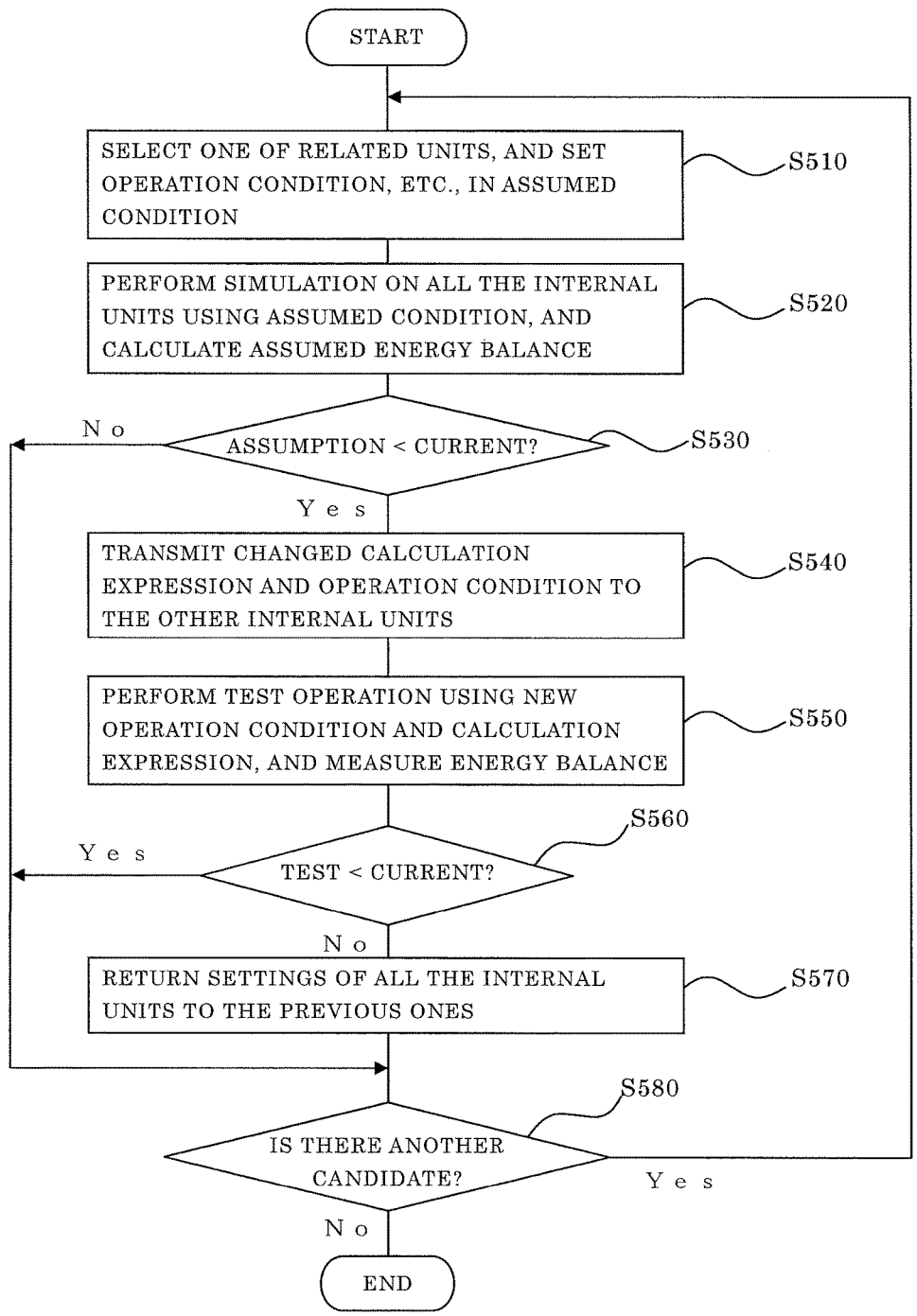
FIG. 13 is a flowchart illustrating detailed processing of S500 step.

A relationship between the internal and external optimization processing section 150 that executes S500 step and the other means is illustrated in FIG. 12. Also, a detailed flow of S500 step is illustrated by a flowchart in FIG. 13. When the processing in FIG. 13 is started, a unit having a high priority is selected from the related unit identification table 280, and the operation condition, etc., of the assigned facilities corresponding thereto are set to the assumed conditions (S510 step). Next, the energy-balance calculation expressions and the operation conditions of the target unit and the other internal units, that have been read from the optimized expression and condition identification table 270, and the assumed conditions are combined, simulation covering the range of all the internal units is performed, and assumed energy balance is calculated (S520 step).

In this regard, here, the relationship table 230 is not referenced. This is because, the related units generally have different building structures as that of the target building of the target unit, and there is a possibility that relationship data of the related units do not correspond to the target unit. It is therefore desirable to perform simulation not only on the assigned range, but also on all the internal units.

Next, a comparison is made between this assumed energy balance and the current energy balance, and a determination is made of whether the assumed energy balance is more energy saving or not (S530 step). If the assumed energy balance is not more energy saving, the flow branched leftward and proceeds to S580 step. Also, if the assumed energy balance is more energy saving, the flow branches downward and proceeds to S540 step, and the assumed conditions are transmitted to the other internal units for preparation of test operation. Next, the processing proceeds to S550 step, test operation is performed under the assumed condition to determine whether more energy is actually saved than the current condition for one day, and test energy balance is measured. Next, a determination is made of whether the test energy balance is more energy saving than the current energy balance or not (S560 step). If more energy is saved, the assumed conditions are stored in the optimized expression and condition identification table 270, and the flow branched leftward and proceeds to S580 step. Also, if more energy is not saved, the flow branches downward, the settings of all the internal units are returned to the states before the test operation (S570 step), and also proceeds to S580 step. In S580 step, a determination is made of whether there remains an unselected related unit in the related unit identification table 280. If an unselected related unit remains, the processing returns to S510 step and repeats the flow, whereas it does not remain, the processing is completed. Thus, the flow in FIG. 13, that is to say, S500 step in FIG. 3 is completed, and the initial processing flow in FIG. 3, in which a new unit is added to the system or the settings of the existing units are changed and then restarted, is completed.

In this manner, in the initial processing of the case where a new unit is added, etc., the related units are searched, and more suitable operation conditions, etc., are searched and adopted. Accordingly, better operation conditions, etc., are searched among the units with each other, and thus it becomes possible for a plurality of buildings in which the units are installed to improve energy saving levels with the passage of time by referencing optimum conditions, etc., with each other. Thereby, any buildings in which the units are installed gradually approach to an utmost energy saving level at that time, thus all the buildings in which the units are installed improve their energy saving levels, and thereby the levels become equal.

Figure 14:
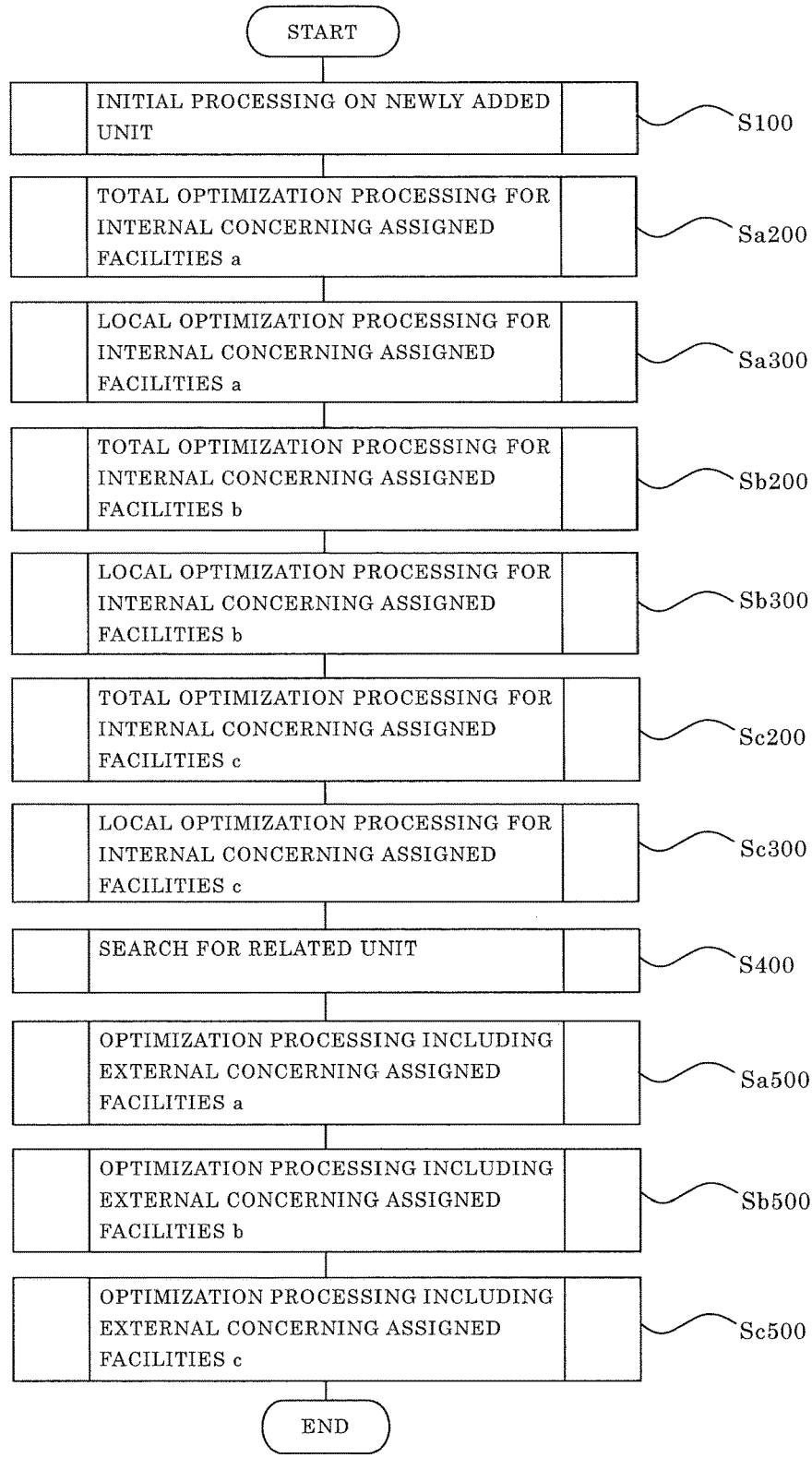
FIG. 14 is a flowchart schematically illustrating an initial processing flow of a unit in charge of a plurality of facilities.

Now, for the sake of simplicity, a description has been given on the condition that the unit newly added, etc., has only one assigned facility using FIG. 3 to FIG. 13. However, in reality, each unit takes charge of a plurality of facilities installed at a relatively near site. This is for easiness of the installation and reduction of apparatus cost. Thus, an example of a flowchart corresponding to the flowchart in FIG. 3 is illustrated in FIG. 14 in the case where the assigned facilities of the target unit are three, namely a, b and c. In comparison with the flowchart in FIG. 3, three steps, that is to say, Sa200 step, Sb200 step and Sc200 step, which are processing on the assigned facilities a, b and c, respectively, in FIG. 14, are disposed correspondingly to S200 step in FIG. 3. In the same manner, in FIG. 14, Sa300 step, and the like that take charge of the processing on the three assigned facilities a, b and c are disposed correspondingly to each of S300 step and S500 step in FIG. 3. In this manner, in the case of a plurality of assigned facilities, necessary steps should be added correspondingly to the number of the assigned facilities.

Figure 15:
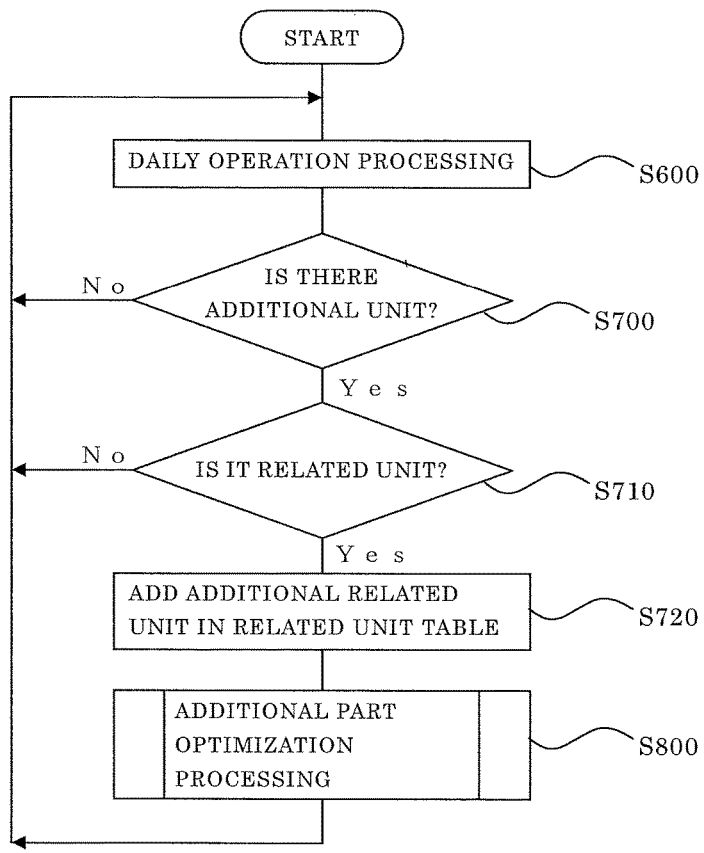
FIG. 15 is a flowchart schematically illustrating a steady processing flow of a unit.
Figure 16:
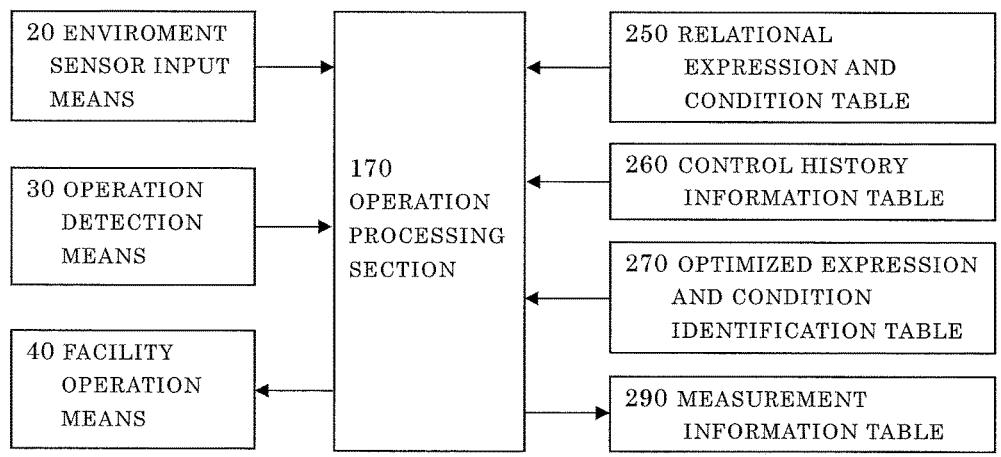
FIG. 16 is a block diagram illustrating a relationship between an operation processing section and the other means.

Next, a description will be given of processing in a steady state of the existing units after the initial processing is completed. In the steady state, each of the unit controls the energy balance in the assigned range on a daily basis by controlling the assigned facilities on the basis of the operation conditions determined to be optimum, etc., and the measurement information from the sensors. The overall flow is illustrated in FIG. 15. Next to the initial processing, when the steady processing is started, daily operation processing is performed (S600 step). A relationship between the operation processing section 170 performing the daily operation processing and the other means is illustrated in FIG. 16. In this step, the unit controls operation of the assigned facility on a daily basis using the measurement information of the assigned sensors and the operation condition.

Control of the facilities is carried out using operation conditions determined in accordance with the characteristics and state for each of the facilities and target values included therein. The target values should be determined in advance using a numerical expression set in initial settings or a correlation equation (auto-correlation, correlation with the others, regression equation, multiple regression equation, and others) that is calculated from the monitoring data, in accordance with external conditions, such as outside temperature, humidity, a number of persons inside, etc. For example, for an air conditioner, a temperature and a humidity are determined so that a comfort index for each room (PMV=Predicted Mean Vote) is zero using information, such as temperature and humidity, etc., from the assigned sensors, and those values are used as control target values of the air conditioner. In this regard, a comfort index means an index calculated using a comfort equation developed by Fanger using the following elements on which a person's feeling of heat and cold depends, such as temperature, humidity, radiation temperature, an airflow velocity, an amount of human activity, an amount of closing (CLO value), a thermal resistance, and also using $CO_2$ density and CO density as necessary. PMV=0 means statistically that 95% of persons feel neither hot nor cold and feel comfortable. The numeric value of the above varies in the range between +3 and −3. If PMV becomes plus, 95% of persons feel hot, whereas if PMV becomes minus, the persons feel cold.

Also, in the case where the facility machines are lighting facilities, control target values are set on a number of illumination lamps and their positions allowed to provide minimum illuminance necessary for work assumed in each room from information, such as a size of each room, sizes and positions of windows, a rate of sunshine, a capacity of persons on the basis of a calculation expression determined in advance for each room. This is because in a place where sunshine provides sufficient illuminance for daily work, turning off the lights is energy saving. Also, in the case where the facility machines are window opening/closing apparatuses, a determination is made of whether each window is opened for ventilation or not for each window from information on temperature, humidity, an amount of rain, an amount of wind, a wind direction, etc., outside of the building, and information on temperature, humidity, within working hours or not, etc., of each room using a calculation expression determined in advance so that operation energy of the air conditioners become small while maintaining comfort index, and thus control target values for each window are determined. For example, if outdoor air temperature is lower than room temperature, it becomes more energy saving to open the windows to ventilate than performing cooling operation by the air conditioner.

Also, in the case where the assigned facilities are office machines, such as a personal computer, a printer, etc., a type and number of machines that have been used in a power-on and waiting state for a certain period of time conventionally are identified in advance, control target values are determined in order to turn off the power to the machines, and control is performed so as to reduce the number of the machines in a waiting state or turning off the power source using the control target values thereafter. Also, the number of persons in a room is measured by a $CO_2$ sensor, an image sensor, an infrared ray sensor, etc., a type and number of machines that should be running are determined in advance in accordance with the number of persons in a room on the basis of the calculation expression determined in advance, and settings are determined so that the power source to machines exceeding those machines are turned off. This is because these office machines are considered to uselessly consume energy.

In this manner, control is performed using the target values that are set and the operation conditions including the target values. It is desirable to set an interval for one round of control to a relatively long time, for example, at least from 5 to 10 minutes of a unit time in the case of air conditioning control. Also, in the case of changing window shade angles using daylight in accordance with a change of sunlight angle such that reflected light lights a ceiling up in summer, and light from window shades falls on a floor in winter, it is desirable to set an interval of control to about one minute in order to perform control against an external element, such as a change in the amount of sunshine in this case.

In S600 step, when control of the assigned facilities is performed at least for one round, the flow proceeds to S700 step. A determination is made of whether there is a newly added unit or a unit that has been restarted after the facilities are changed on the basis of whether there has been internal unit search processing from the other units after the previous daily operation processing of the target unit is completed. This is because that addition of a new unit or a restart accompanied by a change of a facility occurs on a daily basis in a system including a plurality of buildings, and thus a new operation condition, etc., that have been brought into the system by the above are to be imported in the target unit immediately. If there is no added unit, etc., the flow branched leftward and returns to S600 step, and the daily operation processing is performed again. Also, if there is an added unit, etc., the flow branches downward, a determination is made of whether the added unit, etc., is a related unit or not in accordance with the same search item and search range as the flow in FIG. 11 (S710 step).

Figure 17:
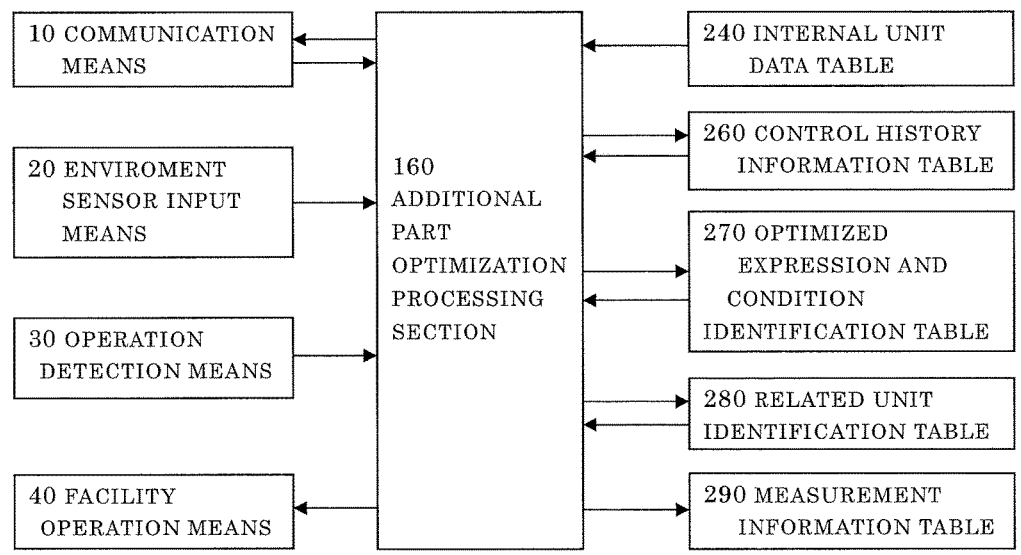
FIG. 17 is a block diagram illustrating a relationship between an additional part optimization section and the other means.

If the added unit, etc., is not a related unit, the flow branched leftward and returns to S600 step, and the daily operation processing is performed. If the added unit, etc., is a related unit, the flow branches downward, and the unit determined as a related unit is stored into the related unit table with a priority (S720 step). Next, additional part optimization processing is performed (S800 step). A relationship between additional part optimization section 160 that executes S800 step and the other means is illustrated in FIG. 17. Also, a detailed flowchart of S800 step is illustrated in FIG. 18.

Figure 18:
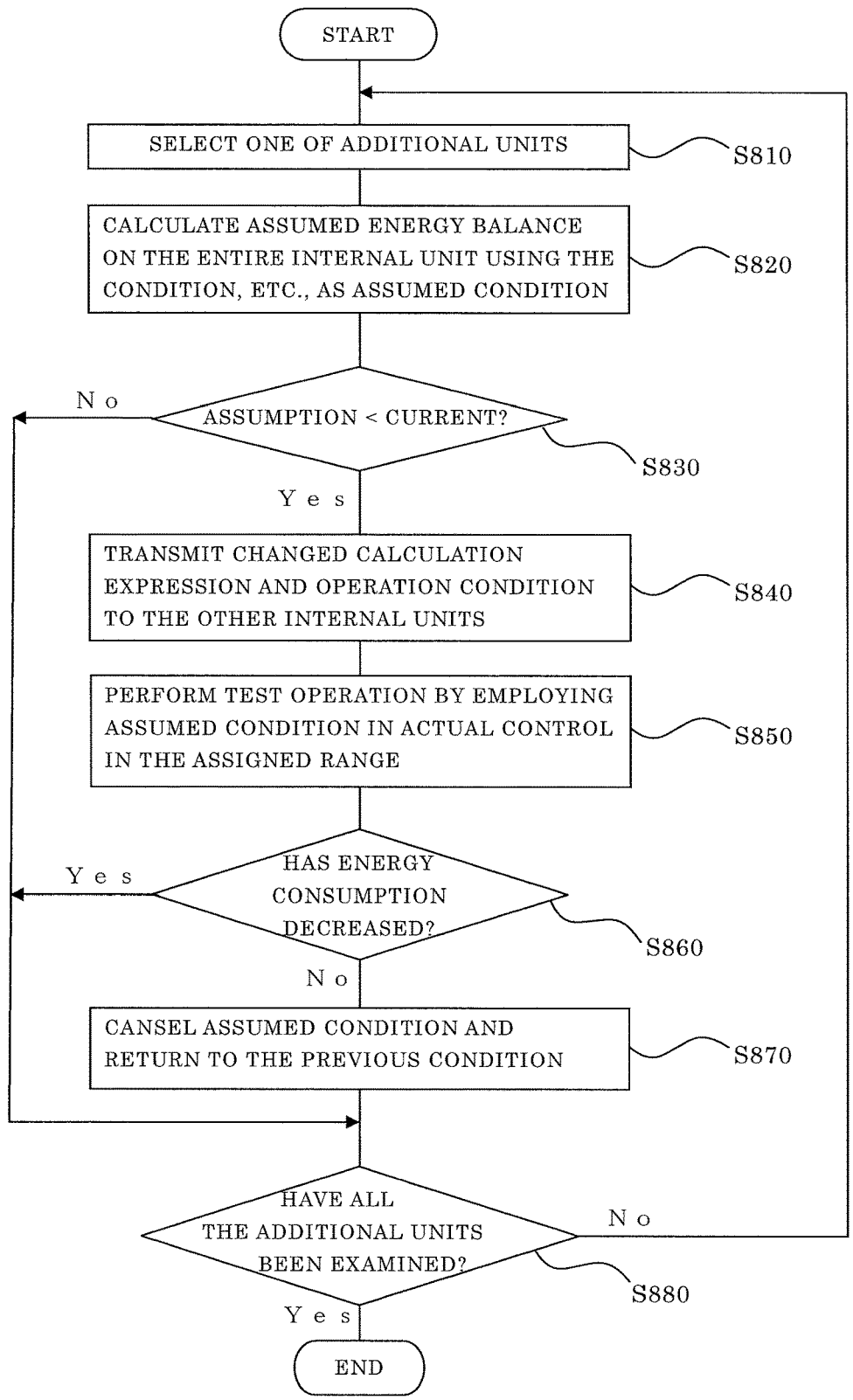
FIG. 18 is a flowchart illustrating detailed processing of S800 step.
Figure 19:
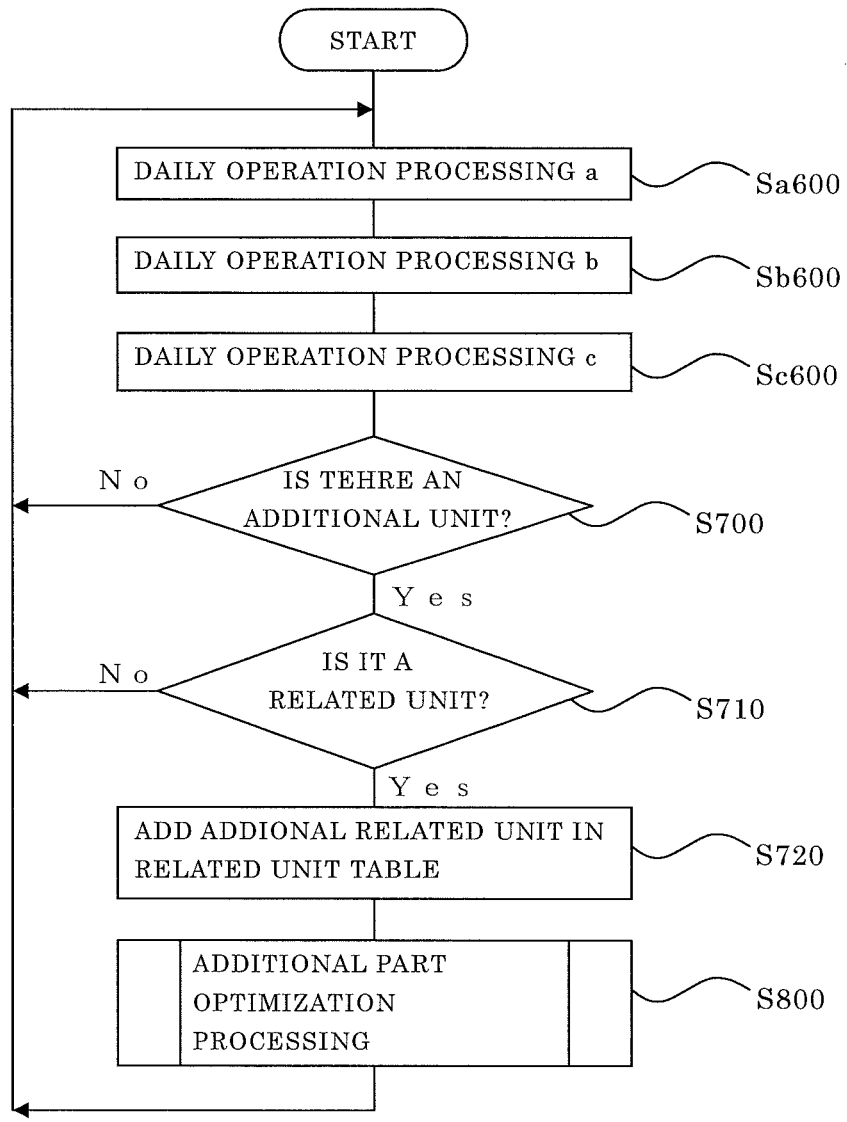
FIG. 19 is a flowchart schematically illustrating a steady processing flow of a unit in charge of a plurality of facilities.

The additional part optimization processing in FIG. 18 is performed in the same manner as that of the flow in FIG. 13 except that the related unit is selected and used which is identified in S700 step to S710 step and added, etc. in place of the related unit searched in the initial processing selected in the flow in FIG. 13, and thus a detailed explanation is omitted. Accordingly, also in this flow, a search is made for better operation conditions, etc., at any time due to addition of a new unit or restart of an existing unit, thus it becomes possible for each unit to learn optimum conditions, etc., of a plurality of buildings in which units are installed with each other with the passage of time, and thereby it becomes possible to improve an energy saving level of the entire system. Thus, S800 step is completed, and the flow returns to the daily operation processing again. In the following, the unit repeatedly executes the flow in FIG. 15 until some break operation is performed.

FIG. 15 is an example of a daily operation processing flow in the case where one unit takes charge of one facility. Next, a description will be given of the case where one unit takes charge of a plurality of facilities as FIG. 14. FIG. 18 illustrates an example of a flow in the case where one unit takes charge of the three facilities a, b, and c in the same manner as in FIG. 14. In comparison between FIG. 18 and FIG. 15, there is a different point in that the daily operation processing of S600 step in FIG. 15 corresponds to three steps, Sa600 step, Sb600 step, and Sc600 step, which are disposed correspondingly to the three assigned facilities a, b, and c in FIG. 18. That is to say, operation processing for three assigned facilities is performed in sequence, then optimization processing related to the additional unit is performed, and the daily operation processing of the assigned facilities is performed again. In this manner, it becomes possible to perform processing in the case of a plurality of assigned facilities without problems in particular.

In the above, a description has been specifically given of an embodiment according to the present invention. However, the present invention is not limited to a specific mode of the above-described embodiment, and various alterations are possible. For example, in the above description, descriptions have been specifically given of the table structures in the storage section, and step contents of the flow of each control section. However, it is sometimes possible to achieve substantially the same functions even if various variations and order changes, etc., are made to these. Also, for example, in the above, a description has been given of the case where an operation condition, etc., to be an examination candidate is selected in sequence from the top of the table, or a selection is made by adding priorities in advance. However, an examination candidate may be selected randomly using random numbers, and further an artificial intelligence technique, such as a genetic algorithm, etc., may be used for the selection.

In the case of using a genetic algorithm, it is possible to execute the processing in the same manner by the above-described flow. The unit suitably selects conditions from control methods, setting values, variables, etc., in a environment that is changing variously, such as outdoor-air temperature and humidity conditions, usability of the building, etc., using a genetic algorithm to minimize the energy balance. First, the simulation is performed or actual control is performed using specific settings and control method. As a result, if a previously assumed minimum result has not been attained, the settings are changed a little, the simulation, etc., is performed again, and a determination is made of a difference with the assumed minimum. This is repeated with changing a plurality of control methods, the setting values, and the variables. Finally, a result that is determined to be a minimum is recorded as an optimization result. After that, this result is reused. The unit measures and records various conditions, such as outdoor-air temperature, humidity, and wind direction, etc., so that it becomes possible to perform condition settings at the time of the control. It becomes possible to analyze which control conditions are good in accordance with a combination of the measurement values of a plurality of sensors. In this regard, logic of the optimization processing may be single, or a combination of a plurality of pieces of logic may be used. For example, the same logic may be used for the overall optimization processing, or at least one different piece of logic may be used.

Also, in the above, descriptions have been given by handling energy saving and minimizing carbon dioxide emissions equally. However, in some cases, there arise practical differences between the two. In such a case, the unit and the system should be determined in advance whether to be operated for energy saving or for minimization of carbon dioxide emissions. In this regard, if the purpose is to minimize carbon dioxide emissions, the portion of the description on energy and energy consumption should be changed to carbon dioxide emissions.

Also, in the above, descriptions have been given that sources of new operation conditions derive from the case where a unit is newly installed in the system, and the case where existing units are restarted after facilities are added and changed, etc. In addition to these, it is desirable to retrieve operation conditions that were suitable at a certain point of the past by autocorrelation processing of measurement information of one unit. There might be a certain time zone within a year in which outdoor conditions become very similar, such as, temperature, humidity, sunshine, amount of rain, wind speed, etc., or room conditions become very similar, such as a number of persons inside, a way to use illumination load or outlet load or production load, etc., to those of the other time zone. It is desirable for the similar time zone to change the optimization conditions in chronological order on the basis of the autocorrelation. This is because, for example, an operation condition most suitable for a certain summer may not be suitable for the next winter and thus may be changed on the basis of seasonal variations, etc., but there is a high possibility that the operation condition become most suitable for the next summer again.

Also, in the above, a description has been given of the case where energy simulation is performed in both the initial processing and the steady processing using daily measurement information for one day. However, it is possible to perform the energy simulation for a time zone less than one day while the assigned range is in an active state. Also, it is desirable to perform energy simulations for each period individually, such as one week, one month, and four seasons (three months), after going into a steady state. There are cases where even if energy saving is obtained in a short-term basis, long-term energy saving is not obtained because of periodical nature of human activities and seasonal changes. If energy saving is not obtained by a long-term operation, the operation conditions of the facilities should be changed to that for a short period on the basis of the autocorrelation.

Figure 20:
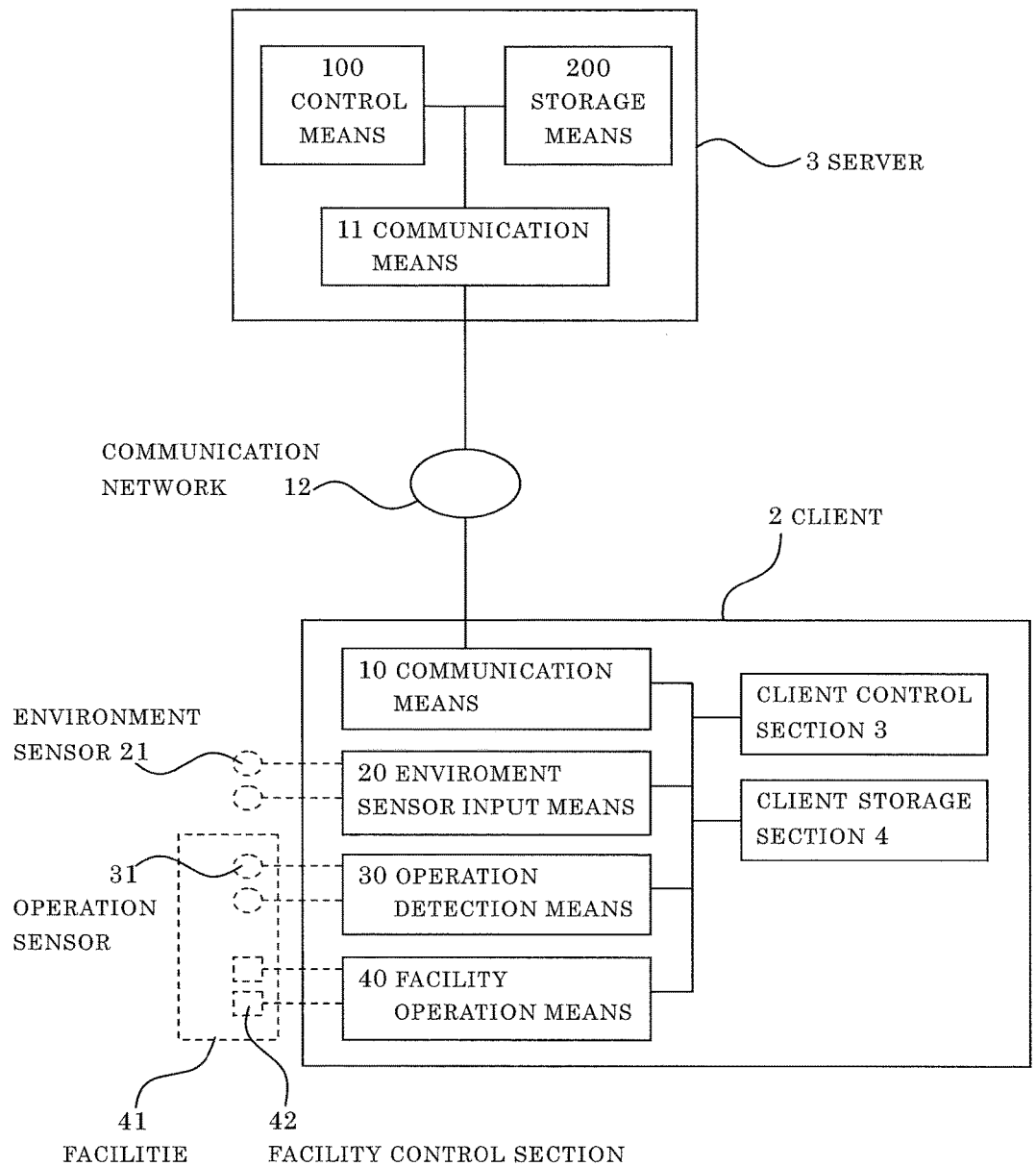
FIG. 20 is a diagram illustrating a schematic configuration in the case of configuring a client/server system.

Also, in the above, the system has been constructed as a collection of units. However, it is possible to configure the system as a server/client system. An example of the configuration is illustrated in FIG. 20. In FIG. 20, a server 3 and a client 2 (for the sake of simplicity, only one client is illustrated) are connected through a communication network 12 in a communicable manner. The server 3 is provided with the control means 100 and the storage means 200 among the functions of the unit 1 illustrated in FIG. 2 for each plurality of units assigned to the server. Thereby, the server stores various kinds of data and performs optimization processing of the target building. Also, the client 2 that is connected to the server 3 in a communicable manner includes an interface function between assigned sensors 21, 31 and assigned facilities 41, and the server 3 among the functions of the unit 1, and includes a minimum client control section 3 that can control the sensor input means 20, the facility operation means 40, etc., and the communication means 10, and a client storage section 4. In this example of the configuration, functions of a unit is divided into a server and a client, and thus a unit in the above description should be replaced by a client or a server and then interpreted in accordance with the functions thereof.

In this manner, optimization processing on the target building should be uniquely performed only on the server, and it becomes unnecessary to perform the processing repeatedly for each internal unit as the example of the configuration in FIG. 2. On the other hand, if the server 3 goes down, all the daily control of the target buildings assigned to the server disadvantageously goes down. Accordingly, the system may have an in-between configuration of the systems in FIG. 2 and in FIG. 20, the optimization processing may be performed on the server side, and the daily control of the facilities may be performed on the client side on the basis of the result. Further, a mixture of a collection of the units and a server/client system may be configured. In this case, information exchange is performed with each other, but for the optimization processing, the individual units and the sever should uniquely perform the processing of the individually assigned parts.

The above-described unit is an example in which a computer program as software stored in the unit and hardware is operated in cooperation. However, in place of the software, the system may be configured using dedicated hardware performing each operation of each software portion. In addition to the above, an input apparatus, a display, a printer, etc., may be connected to the unit as peripheral devices. Here, the input apparatus means an input device, such as a keyboard, mouse, etc. The display means a CRT (Cathode Ray Tube), a liquid crystal display apparatus, etc. Also, the above-described storage means is included in the unit, but a mode in which the storage device is installed in the other apparatus, and the storage device is accessed through communication can be employed. The storage means includes a nonvolatile memory, such as a hard disk device, an optical disc device, a flash memory, etc., a read-only recording medium, such as a CD-ROM, etc., a volatile memory, such as a RAM, or a combination of these.

INDUSTRIAL APPLICABILITY

The present invention makes it possible to control energy balance and carbon dioxide emissions of a building, and can be used for saving energy and reducing carbon dioxide emissions.

The invention claimed is:
1. A unit for saving energy for a building, comprising:
an input interface that receives information from sensors assigned to the unit;
a communication network capable of mutually communicating with other units;
a unit-specific information storage that stores information in a format suitable for an exchange of the stored information between different units,
wherein the stored information comprises a location, a structure, and an environmental condition of a target building in which the unit is installed, and informa- tion for identifying the sensors assigned to the unit and facilities assigned to the unit; and a CPU programmed to act as:

an identification section for identifying an internal unit being another unit installed in the target building and an external unit being another unit installed in a building other than the target building by the unit-specific information;

an internal optimization section for reading an energy calculation expression of an internal unit identified by the identification section, selecting any one of operation conditions provided in the unit in advance, composing an energy calculation expression of an entire target building and performing simulation, and optimizing an energy balance of the target building;

a related unit search section for searching for other units having an architectural condition related to the unit, the other units including a unit determined by the identification section as an external unit in addition to the other internal units;

an internal and external optimization processing section for reading an operation condition corresponding to the unit from the other internal units and external units searched by the related unit search section, performing simulation using the read operation condition and the entire energy calculation expression, and optimizing an energy balance of the target building; and an operation section for operating the facilities assigned to the unit on the basis of the optimized operation conditions and the information from the assigned sensors, wherein the building is a collection of at least two buildings where energy management is integrally performed;

wherein the target building is another collection of at least two buildings where energy management is integrally performed;

wherein the building other than the target building is yet another collection of at least two buildings where energy management is integrally performed.

2. The unit according to claim 1,
wherein the identification section and the internal optimization section are executed after the unit is newly installed in the target building, or restarted.

3. The unit according to claim 1, further comprising a relationship table for identifying in advance whether or not operation of the assigned facilities influences the other facilities in energy,
wherein a range of the optimization processing by the internal optimization section is changed by information in the relationship table.

4. The unit according to claim 1,
wherein the related unit search section searches for the other units assumed to perform control on assigned facilities in a similar pattern to the unit in energy balance.

5. The unit according to claim 1,
wherein optimization processing for the saving energy is performed at least in two stages including an initial stage when the unit is newly installed in the target building or restarted, and a stage when the other unit is newly installed or restarted in a steady operation thereafter.

6. The unit according to claim 5,
wherein both optimization processing in a range of a plurality of operation conditions stored in the unit in advance and optimization processing in a range of a plurality of operation conditions read by searching the related units are performed in the initial stage, and thereby at least three-stage optimization processing is performed.

7. The unit according to claim 1,
wherein at least one of the optimization processing is executed by a genetic algorithm.

8. An energy saving system for a building,
wherein the unit according to claim 1 is connected in a communicable manner with other units through a communication network.

9. The energy saving system according to claim 8,
wherein the unit has a parallel relationship with any one of the other units.

10. The energy saving system according to claim 9,
wherein a new candidate for the operation condition is introduced in the system when a new unit is added, or an existing unit is restarted.

11. An energy saving system for a building,
wherein the unit according to claim 2 is connected in a communicable manner with each other through a communication network.

12. An energy saving system for a building,
wherein the unit according to claim 3 is connected in a communicable manner with each other through a communication network.

13. An energy saving system for a building,
wherein the unit according to claim 4 is connected in a communicable manner with each other through a communication network.

14. An energy saving system for a building,
wherein the unit according to claim 5 is connected in a communicable manner with each other through a communication network.

15. An energy saving system for a building,
wherein the unit according to claim 6 is connected in a communicable manner with each other through a communication network.

16. An energy saving system for a building,
wherein the unit according to claim 7 is connected in a communicable manner with each other through a communication network.

17. A server for saving energy for a building, comprising:
a communication network for allowing the server to communicate with a plurality of clients;
a client-specific information storage that stores information in a format suitable for an exchange of the stored information between different clients,
wherein the stored information comprises a location, a structure, and an environmental condition of a target building in which the client is installed, and information for identifying the sensors assigned to the client and facilities assigned to the client; and
a CPU programmed to act as:
an identification section for identifying an internal client being another client installed in the target building and an external client being another client installed in a building other than the target building by the client-specific information;
an internal optimization section for reading an energy calculation expression of an internal client identified by the identification section, selecting any one of operation conditions provided in the server in advance, composing an energy calculation expression of an entire target building and performing simulation, and optimizing an energy balance of the target building;
a related client search section for searching for other clients having an architectural condition related to the client, the other clients including a client determined by the identification section as an external client in addition to the other internal clients; and an internal and external optimization processing section for reading an operation condition corresponding to the client from the other internal clients and external clients searched by the related client search section, performing simulation using the read operation condition and the entire energy calculation expression, and optimizing an energy balance of the target building, wherein the building is a collection of at least two buildings where energy management is integrally performed;

wherein the target building is another collection of at least two buildings where energy management is integrally performed;

wherein the building other than the target building is yet another collection of at least two buildings where energy management is integrally performed.

18. An energy saving system comprising:
a server according to claim 17; and
a plurality of clients connected to the server in a communicable manner,
wherein the clients include an input interface that receives information from sensors assigned to the clients, a CPU programmed to act as an operation section for operating the facilities assigned to the clients, and a communication network for allowing mutual communication with the server.

* * * * *